United States Patent
Kusumoto et al.

(10) Patent No.: US 6,922,302 B2
(45) Date of Patent: Jul. 26, 2005

(54) CALIBRATION METHOD FOR USE IN HEAD LOADING/UNLOADING TYPE DISK APPARATUS

(75) Inventors: Tatsuharu Kusumoto, Higashiyamato (JP); Hidetoshi Kawachi, Nishitama-gun (JP)

(73) Assignee: Kabushiki Kaisha Toshiba (JP)

(*) Notice: Subject to any disclaimer, the term of this patent is extended or adjusted under 35 U.S.C. 154(b) by 39 days.

(21) Appl. No.: 10/659,218

(22) Filed: Sep. 9, 2003

(65) Prior Publication Data

US 2004/0047064 A1 Mar. 11, 2004

Related U.S. Application Data

(62) Division of application No. 10/222,707, filed on Aug. 15, 2002, now Pat. No. 6,661,598, which is a division of application No. 09/382,444, filed on Aug. 25, 1999, now Pat. No. 6,496,319.

(30) Foreign Application Priority Data

Nov. 30, 1998 (JP) .......................................... 10-340058

(51) Int. Cl.[7] .............................................. G11B 21/02
(52) U.S. Cl. .......................................... 360/75; 360/69
(58) Field of Search ....................... 360/75, 69, 78.04, 360/78.08, 31

(56) References Cited

U.S. PATENT DOCUMENTS

| 5,455,723 A | 10/1995 | Boutaghou et al. |
| 5,615,064 A | 3/1997 | Blank et al. |
| 5,663,846 A | 9/1997 | Masuoka et al. |
| 5,768,045 A | 6/1998 | Patton, III et al. |
| 5,781,363 A | 7/1998 | Rowan et al. |
| 6,229,663 B1 | 5/2001 | Yoneda et al. |
| 6,342,985 B1 | 1/2002 | Clare et al. |

FOREIGN PATENT DOCUMENTS

| JP | 01-140478 | 6/1989 | |
| JP | 03-503326 | 7/1991 | |
| JP | 07-192413 | 7/1995 | |
| JP | 8-63920 | 3/1996 | .......... G11B/21/12 |
| JP | 2622003 | 4/1997 | .......... G11B/21/12 |
| JP | 10-69744 | 3/1998 | .......... G11B/21/12 |

OTHER PUBLICATIONS

Japanese Office Action dated May 11, 2004 corresponding to the counterpart Japanese Patent Application No. 10–340058. (See attached English translation.).

Primary Examiner—Sinh Tran
Assistant Examiner—Mitchell Slavitt
(74) Attorney, Agent, or Firm—DLA Piper Rudnick Gray Cary US LLP

(57) ABSTRACT

In a head loading/unloading type disk apparatus, accurate velocity feedback control is implemented by correcting any error in a VCM velocity detection value, which is caused by a temperature change or the like. At the start of loading control for loading a head from a ramp onto a disk, a carriage is pushed against an outer-periphery stopper to set the actual velocity of a VCM to zero. In this state, a VCM velocity detection value detected by a VCM velocity detection circuit is read out. On the basis of this velocity detection value, calibration for correcting the relationship between the VCM current value and the VCM velocity detection value is performed. In the period of head positioning control after the loading, an operation using a timer is periodically performed in which the carriage is pushed against an inner-periphery stopper, the calibration is reexecuted, and the head is returned to the original head position.

6 Claims, 13 Drawing Sheets

CALIBRATION METHOD FOR USE IN HEAD LOADING/UNLOADING TYPE DISK APPARATUS

CROSS-REFERENCE TO RELATED APPLICATION

This application is a divisional application and claims the benefit of U.S. patent application Ser. No. 10/222,707 filed on Aug. 15, 2002 now U.S. Pat. No. 6,661,598, which is a divisional of U.S. patent application Ser. No. 09/382,444 filed on Aug. 25, 1999 which was issued on Dec. 15, 2002 as U.S. Pat. No. 6,496,319, and claims the benefit of the Japanese Patent Application No. 10-340058 filed on Nov. 30, 1998, the disclosure of each is incorporated herein by reference.

BACKGROUND OF THE INVENTION

The present invention relates to a calibration method for use in a head loading/unloading type disk apparatus and, more particularly, to a calibration method suited to automatic adjustment of the velocity detection value used in unloading.

Recently, some disk apparatuses for recording and reproducing information by using a head, e.g., some small magnetic disk apparatuses use a head retraction method called a loading/unloading method. The characteristic feature of this loading/unloading method is as follows. When no data read/write operation is performed, e.g., when the rotation of a disk (recording media) is stopped, a head stops on a ramp mechanism positioned outside the outer periphery of the disk. In this state, the head is moved from a retraction position on the ramp mechanism onto the disk by an instruction from a host to thereby perform a read/write operation. When the read/write operation is complete, the head is returned from the disk onto the ramp mechanism.

The operation of moving the head from the ramp mechanism onto the disk is called loading, and the operation of moving the head from the disk onto the ramp mechanism is called unloading.

Jpn. Pat. Appln. KOKAI Publication No. 8-63920 has disclosed an apparatus for loading and unloading an arm having a head slider to and from a rotary information recording disk by driving the arm by an actuator. In this apparatus, the back electromotive force of a voice coil type driving mechanism of the actuator is detected and fed back to a driving control circuit, and this control circuit controls the position and velocity of the actuator. That is, this reference describes that when loading or unloading is performed, velocity feedback control is performed by detecting the VCM velocity by using the back electromotive force generated in the voice coil motor (VCM).

In this prior art, however, which performs velocity feedback control by detecting the VCM velocity by using the back electromotive force generated in the voice coil motor (VCM), if the resistance of the coil of the VCM changes due to temperature change or the like, the relationship between the value (VCM current value) of current flowing through the VCM and the VCM velocity detection value also changes. This makes accurate velocity feedback control impossible to perform. The above reference does not describe the nature of the problem and a method of solving the problem when the resistance of the coil of the VCM changes due to temperature change or the like and the relationship between the VCM current value and the VCM velocity detection value changes.

BRIEF SUMMARY OF THE INVENTION

Accordingly, it is an object of the present invention to provide a calibration method capable of accurately correcting the relationship between the value of a voice coil motor current flowing through a voice coil motor and a voice coil motor velocity detection value detected by a voice coil motor velocity detection circuit, thereby performing accurate feedback control during loading/unloading.

It is another object of the present invention to provide a calibration method capable of improving the accuracy of a detected velocity by detecting a state in which the VCM resistance changes due to temperature change or the like and this may change the relationship between the VCM current value and the VCM velocity detection value, thereby performing more accurate velocity feedback control.

According to one aspect of the present invention, there is provided a calibration method for use in a head loading/unloading type disk apparatus having a voice coil motor for driving a carriage to move a head in a direction of radius of a disk, a voice coil motor velocity detection circuit for detecting a voice coil motor velocity corresponding to a back electromotive force of the voice coil motor, and a ramp mechanism arranged outside an outer periphery of the disk to retract the head, comprising the steps of: executing, at the start of loading control for loading the head from the ramp mechanism onto the disk, calibration for correcting a relationship between a value of a voice coil motor current flowing through the voice coil motor and the voice coil motor velocity detection value detected by the voice coil motor velocity detection circuit, the calibration being executed by obtaining a voice coil motor velocity detection value detected by the voice coil motor velocity detection circuit in a state where an actual velocity of the voice coil motor is set to zero and a current is supplied to the voice coil motor; and periodically reexecuting the calibration after the head is loaded.

In the present invention, a relationship between a value of a voice coil motor current flowing through the voice coil motor and the voice coil motor velocity detection value detected by the voice coil motor velocity detection circuit is accurately corrected by the calibration. The calibration is executed by obtaining a voice coil motor velocity detection value detected by the voice coil motor velocity detection circuit in a state where an actual velocity of the voice coil motor is set to zero and a current is supplied to the voice coil motor. With this the calibration, the velocity detection value detected by the VCM velocity detection circuit can be accurately corrected by velocity feedback control during unloading. This makes accurate unloading possible.

Generally, when a predetermined time or more has elapsed from loading, the resistance of the VCM coil changes due to temperature change, and this causes an error in the aforementioned relationship corrected by the calibration. So, (velocity feedback control during) unloading may not be accurately performed. In the present invention, however, the calibration is periodically reexecuted after loading. Accordingly, unloading can be accurately performed regardless of the reception timing of an unload instruction.

According to another aspect of the present invention, there is provided a calibration method for use in a head loading/unloading type disk apparatus having a voice coil motor for driving a carriage to move a head in a direction of radius of a disk, a voice coil motor velocity detection circuit for detecting a voice coil motor velocity corresponding to a back electromotive force of the voice coil motor, and a ramp mechanism arranged outside an outer periphery of the disk to retract the head, comprising the steps of: executing, at the start of loading control for loading the head from the ramp mechanism onto the disk, calibration for correcting a relationship between a value of a voice coil motor current flowing through the voice coil motor and the voice coil motor velocity detection value detected by the voice coil motor velocity detection circuit, the calibration being executed by obtaining a voice coil motor velocity detection value detected by the voice coil motor velocity detection circuit in a state where an actual velocity of the voice coil motor is set to zero and a current is supplied to the voice coil motor; and if it is detected that a change in a temperature of the voice coil motor or an ambient temperature thereof from a temperature during loading is not less than a prescribed value after the head is loaded, reexecuting the calibration.

When the VCM coil resistance changes due to temperature change, the aforementioned relationship corrected during loading cannot reflect the present state any longer, and the error increases. This may make accurate unloading impossible. In the present invention, however, if the change in the VCM temperature from that during loading is equal to or larger than a prescribed value, the calibration is reexecuted. Consequently, accurate unloading can be performed.

According to still another aspect of the present invention, there is provided a calibration method for use in a head loading/unloading type disk apparatus having a voice coil motor for driving a carriage to move a head in a direction of radius of a disk, a voice coil motor velocity detection circuit for detecting a voice coil motor velocity corresponding to a back electromotive force of the voice coil motor, and a ramp mechanism arranged outside an outer periphery of the disk to retract the head, comprising the steps of: executing, at the start of loading control for loading the head from the ramp mechanism onto the disk, calibration for correcting a relationship between a value of a voice coil motor current flowing through the voice coil motor and the voice coil motor velocity detection value detected by the voice coil motor velocity detection circuit, the calibration being executed by obtaining a voice coil motor velocity detection value detected by the voice coil motor velocity detection circuit in a state where an actual velocity of the voice coil motor is set to zero and a current is supplied to the voice coil motor; reading out the voice coil motor velocity detection value immediately after loading control is switched to on-track control from the voice coil motor velocity detection circuit and storing the readout value in a memory; and monitoring the voice coil motor velocity detection value detected by the voice coil motor velocity detection circuit while the head is positioned on the disk and, if an absolute value of a difference between the monitored voice coil motor velocity detection value and the voice coil motor velocity detection value stored in the memory is not less than a prescribed value, reexecuting the calibration.

If the absolute value of the difference between the VCM velocity detection value detected immediately after loading control is switched to on-track control and the VCM velocity detection value monitored while the head is positioned on the disk (in the head positioning control state), i.e., the VCM velocity detection value difference is equal to or larger than a prescribed value, it is highly likely that the VCM coil resistance has changed. If this is the case, the error in the aforementioned relationship corrected during loading increases, so unloading may not be accurately performed. In the present invention, however, if the VCM velocity detection value difference is equal to or larger than a prescribed value, the calibration is reexecuted. Consequently, accurate unloading can be performed.

The calibration can also be reexecuted by moving the carriage to the inner-periphery stopper position. If this is the case, the carriage is pushed against the inner-periphery stopper to realize zero VCM velocity, so the calibration can be done with high accuracy.

It is also possible to reexecute the calibration by moving the carriage to the outer-periphery stopper position by unloading and to reload after the calibration. If this is the case, the carriage is pushed against the outer-periphery stopper to realize zero VCM velocity, so the calibration can be done with high accuracy.

According to still another aspect of the present invention, there is provided a calibration method for use in a head loading/unloading type disk apparatus having a voice coil motor for driving a carriage to move a head in a direction of radius of a disk, a voice coil motor velocity detection circuit for detecting a voice coil motor velocity corresponding to a back electromotive force of the voice coil motor, and a ramp mechanism arranged outside an outer periphery of the disk to retract the head, comprising the steps of: executing, at the start of loading control for loading the head from the ramp mechanism onto the disk, calibration for correcting a relationship between a value of a voice coil motor current flowing through the voice coil motor and the voice coil motor velocity detection value detected by the voice coil motor velocity detection circuit, the calibration being executed by obtaining a voice coil motor velocity detection value detected by the voice coil motor velocity detection circuit in a state where an actual velocity of the voice coil motor is set to zero and a current is supplied to the voice coil motor; and if a predetermined time has elapsed since the head is loaded when an unload instruction is received, reexecuting the calibration and performing unloading thereafter.

As already described above, when a predetermined time or more has elapsed from loading, the VCM coil resistance changes due to temperature change, and this increases an error in the aforementioned relationship corrected during loading. So, unloading may not be accurately performed. In the present invention, however, the elapsed time from loading is checked when an unload instruction is received. If a predetermined time or more has elapsed, the calibration is reexecuted, and then unloading is performed. Therefore, accurate unloading can be performed.

According to still another aspect of the present invention, there is provided a calibration method for use in a head loading/unloading type disk apparatus having a voice coil motor for driving a carriage to move a head in a direction of radius of a disk, a voice coil motor velocity detection circuit for detecting a voice coil motor velocity corresponding to a back electromotive force of the voice coil motor, and a ramp mechanism arranged outside an outer periphery of the disk to retract the head, comprising the steps of: executing, at the start of loading control for loading the head from the ramp mechanism onto the disk, calibration for correcting a relationship between a value of a voice coil motor current flowing through the voice coil motor and the voice coil motor velocity detection value detected by the voice coil motor velocity detection circuit, the calibration being executed by obtaining a voice coil motor velocity detection value detected by the voice coil motor velocity detection circuit in a state where an actual velocity of the voice coil motor is set to zero and a current is supplied to the voice coil motor; and if a change in a temperature of the voice coil motor or an ambient temperature thereof from the temperature during loading is not less than a prescribed value when an unload instruction is received, reexecuting the calibration and performing unloading thereafter.

As already described above, if the VCM coil resistance changes due to temperature change, the aforementioned relationship corrected during loading cannot reflect the present state any longer, and the error increases. This may make accurate unloading impossible to perform. In the present invention, however, if the change in the VCM temperature from that during loading is equal to or larger than a prescribed value, the calibration is reexecuted, and then unloading is performed. Therefore, accurate unloading can be performed.

According to still another aspect of the present invention, there is provided a calibration method for use in a head loading/unloading type disk apparatus having a voice coil motor for driving a carriage to move a head in a direction of radius of a disk, a voice coil motor velocity detection circuit for detecting a voice coil motor velocity corresponding to a back electromotive force of the voice coil motor, and a ramp mechanism arranged outside an outer periphery of the disk to retract the head, comprising the steps of: executing, at the start of loading control for loading the head from the ramp mechanism onto the disk, calibration for correcting a relationship between a value of a voice coil motor current flowing through the voice coil motor and the voice coil motor velocity detection value detected by the voice coil motor velocity detection circuit, the calibration being executed by obtaining a voice coil motor velocity detection value detected by the voice coil motor velocity detection circuit in a state where an actual velocity of the voice coil motor is set to zero and a current is supplied to the voice coil motor; reading out the voice coil motor velocity detection value immediately after loading control is switched to on-track control from the voice coil motor velocity detection circuit and storing the readout value in a memory; and monitoring the voice coil motor velocity detection value detected by the voice coil motor velocity detection circuit when an unload instruction is received and, if an absolute value of a difference between the monitored voice coil motor velocity detection value and the voice coil motor velocity detection value stored in the memory is not less than a prescribed value, reexecuting the calibration and performing unloading thereafter.

As already described above, if the difference between the VCM velocity detection values is equal to or larger than a prescribed value, it is highly likely that the VCM coil resistance has changed. So, the aforementioned relationship corrected during loading can no longer reflect the present state, and the error increases. This may make accurate unloading impossible. In the present invention, however, if the difference between the VCM velocity detection values is equal to or larger than a prescribed value, the calibration is reexecuted, and then unloading is performed. Therefore, accurate unloading can be performed.

The reexecution of the calibration when the unload instruction is received can also be performed by moving the carriage to the inner-periphery stopper position. If this is the case, the carriage is pushed against the inner-periphery stopper to realize zero VCM velocity, so the calibration can be done with high accuracy.

According to still another aspect of the present invention, there is provided a calibration method for use in a head loading/unloading type disk apparatus having a voice coil motor for driving a carriage to move a head in a direction of radius of a disk, a voice coil motor velocity detection circuit for detecting a voice coil motor velocity corresponding to a back electromotive force of the voice coil motor, and a ramp mechanism arranged outside an outer periphery of the disk to retract the head, comprising the steps of: executing, at the start of loading control for loading the head from the ramp mechanism onto the disk, calibration for correcting a relationship between a value of a voice coil motor current flowing through the voice coil motor and the voice coil motor velocity detection value detected by the voice coil motor velocity detection circuit, the calibration being executed by obtaining a voice coil motor velocity detection value detected by the voice coil motor velocity detection circuit in a state where an actual velocity of the voice coil motor is set to zero and a current is supplied to the voice coil motor; when an unload instruction is received, performing unloading by using a result of the calibration during loading; and if the unloading indicates abnormality, moving the carriage to an inner-periphery stopper position, reexecute the calibration, and again performing unloading by using a result of the reexecuted calibration.

When unloading control is performed in accordance with an unload instruction, unloading may not be accurately performed depending on the error in the aforementioned relationship corrected during loading. Unloading abnormality occurs if the VCM current value during unloading control does not reach a current value by which the head can be unloaded to the ramp mechanism. If this is the case, it is highly likely that the head is not present on the ramp mechanism. In the present invention, therefore, if unloading abnormality occurs, the carriage is moved to the inner-periphery stopper position and pushed against the inner-periphery stopper. In this state, the calibration is reexecuted, and unloading is again performed by using this updated velocity correction value. This makes accurate unloading feasible.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL
VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

An embodiment of the present invention will be described below with reference to the accompanying drawings.

Figure 1:
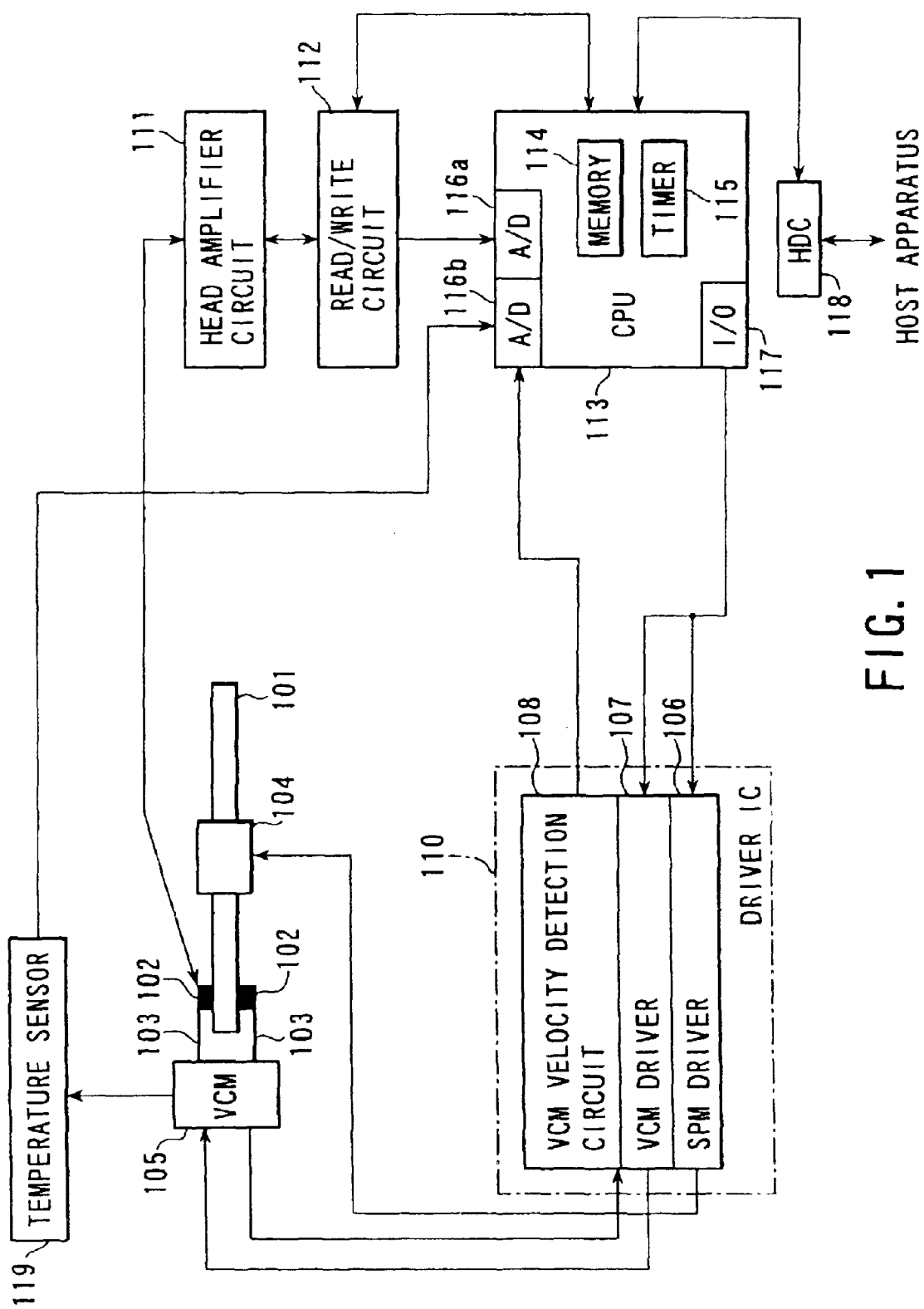
FIG. 1 is a block diagram showing the whole arrangement of a magnetic disk apparatus according to one embodiment of the present invention.

FIG. 1 is a block diagram showing the entire arrangement of a magnetic disk apparatus according to one embodiment of the present invention.

In FIG. 1, reference numeral 101 denotes a disk (magnetic disk) as a data recording medium; and 102, heads (magnetic heads) used to write (record) data to the disk 101 and read (reproduce) data from the disk 101. These heads 102 face the two surfaces of the disk 101. In the arrangement shown in FIG. 1, the magnetic disk apparatus has one disk 101. However, a plurality of disks can also be stacked in the magnetic disk apparatus.

A large number of concentric tracks are formed on each surface of the disk 101. A plurality of servo areas recording servo data for positioning control and the like are formed at equal intervals on each track. On the disk 101, these servo areas are radially arranged over the tracks from the center. Data areas (user areas) are formed between the servo areas. A plurality of data sectors are set in each data area. The servo data contains a cylinder code indicating the cylinder number of a cylinder in which the servo area exists, and burst data indicating a positional error in the cylinder indicated by the cylinder code by the amplitude of waveform.

Figure 2:
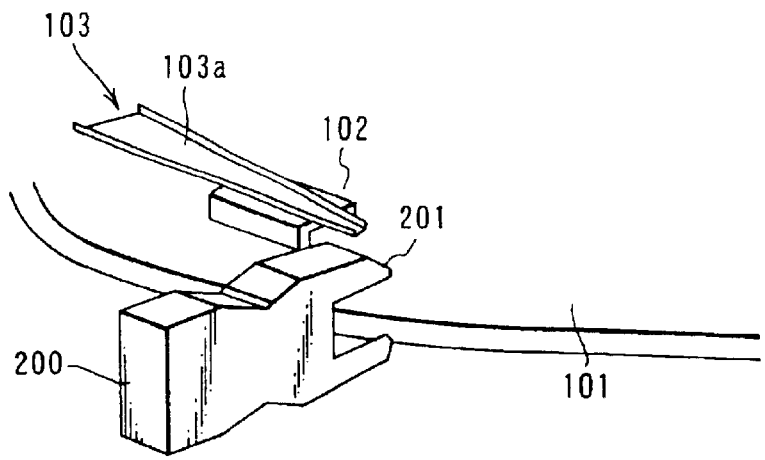
FIG. 2 is a view principally showing the external appearance of a ramp onto which a head in unloaded.

Each head 102 is attached to a carriage (head moving mechanism) 103 as a rotary actuator. The head 102 moves in the direction of radius of the disk 101 in accordance with the rotational angle of the carriage 103. By this seek operation, the head 102 lands on a target track. As shown in FIG. 2, a ramp (ramp mechanism) 200 for laying the head 102 retracted when the rotation of the disk 101 is stopped is arranged outside the outer periphery of the disk 101. This ramp 200 is located in a predetermined position, close to the disk 101, on the moving path of an end portion (tab) of a suspension 103a attached to the carriage 103. An inclined portion 201 is formed on an end portion (close to the disk 101) of the ramp 200 to facilitate retraction of the head 102. In the course of unloading for moving the head 102 from the disk 101 to the ramp 200, the end portion (tab) of the suspension 103a of the carriage 103 slides upward on the inclined portion 201 of the ramp 200. Consequently, the head 102 is lifted from the disk 101, slides on the ramp 200, and stops in a predetermined position.

Referring back to FIG. 1, a spindle motor (to be referred to as an SPM hereinafter) 104 rotates the disk 101 at high velocity. A voice coil motor (to be referred to as a VCM hereinafter) 105 drives the carriages 103.

The SPM 104 is driven by a control current (SPM current) supplied from an SPM driver (SPM driving circuit) 106. The VCM 105 is driven by a control current (VCM current) supplied from a VCM driver (VCM driving circuit) 107. A VCM velocity detection circuit 108 detects (a voltage representing) the driving velocity (VCM velocity) of the VCM 105, which is determined by the back electromotive force (VCM back electromotive force) generated in the VCM 105 when the VCM 105 is driven. The detected value of this VCM velocity indicates the moving velocity of the head 102. In this embodiment, a driver IC 110 as a one-chip integrated circuit implements the SPM driver 106, the VCM driver 107, and the VCM velocity detection circuit 108. A CPU 113 (to be described later) determines values (control amounts) for determining the control currents to be supplied from the SPM driver 106 and the VCM driver 107 to the SPM 104 and the VCM 105, respectively.

After landing on a target track of the disk 101 by seek operation, the head 102 scans the track by the rotation of the disk 101. By scanning, the head 102 sequentially reads out servo data from servo areas equally spaced on the track. Also, the head 102 reads or writes data with respect to a target data sector by scanning.

The head 102 is connected to a head amplifier circuit (head IC) 111 mounted on a flexible printed circuit board (FPC). This head amplifier circuit 111 controls input and output of read/write signals with respect to the head 102. The head amplifier circuit 111 amplifies an analog signal (a read signal of the head 102) read out by the head 102. Also, the head amplifier circuit 111 performs predetermined signal processing for write data supplied from a read/write circuit (read/write IC) 112, and supplies the processed signal to the head 102.

The read/write circuit 112 has an AGC (Automatic Gain Control) function, decoding function (read channel), encoding function (write channel), and servo extracting function. The AGC function amplifies the analog signal (the read signal of the head 102), which is read out from the disk 101 by the head 102 and amplified by the head amplifier circuit 111, to a constant voltage. The decoding function performs signal processing necessary to reconstruct, e.g., NRZ code data from the read signal amplified by the AGC function. The encoding function performs signal processing necessary to record data on the disk 101. The servo extracting function extracts servo data from the read signal.

The CPU (Central Processing Unit) 113 contains a ROM (Read Only Memory) storing control programs and controls the individual components of the magnetic disk apparatus in accordance with the control programs. In addition to the ROM, the CPU 113 contains a memory 114 constructed of, e.g., a RAM (Random Access Memory), a timer 115, A/D (analog-to-digital) converters 116a and 116b, and an I/O (Input/Output) interface 117. The A/D converter 116a converts the burst data (burst signal) in the servo data extracted by the read/write circuit 112 into digital data. The A/D converter 116b converts the VCM velocity detection value detected by the VCM velocity detection circuit 108 and the temperature measurement value (VCM temperature) of the VCM 105, which is measured by a temperature sensor 119 (to be described later), into digital data.

The CPU 113 calculates head position on the basis of the cylinder code in the servo data extracted by the read/write circuit 112 and the burst data in the servo data extracted by the read/write circuit 112 and input via the A/D converter 116a. The CPU 113 determines a control amount for moving (seeking and positioning) the head 102 to a target position on a target track in units of servo areas. The CPU 113 supplies this control amount to the VCM driver 107 via the I/O interface 117 to perform head positioning control by which the head 102 is positioned in the target position by seek operation.

In the course of loading for moving the head 102 from the ramp 200 onto the disk 101 and unloading for retracting the head 102 from the disk 101 onto the ramp 200, the CPU 113 calculates a loading/unloading velocity control amount on the basis of the VCM velocity detection value detected by the VCM velocity detection circuit 108 and converted into digital data by the A/D converter 116b. The CPU 113 supplies this control amount to the VCM driver 107 via the I/O interface 117 to perform (loading/unloading control by) velocity feedback control.

A hard disk controller (HDC) 118 performs protocol processing for communicating commands and data with a host apparatus (host system), read/write control for the disk 101 via the read/write circuit 112, and control for transfer of read/write data with respect to the host apparatus.

The temperature sensor 119 measures the temperature of the VCM 105 or the temperature (VCM temperature) in the periphery (vicinity) of the VCM 105.

Figure 3:
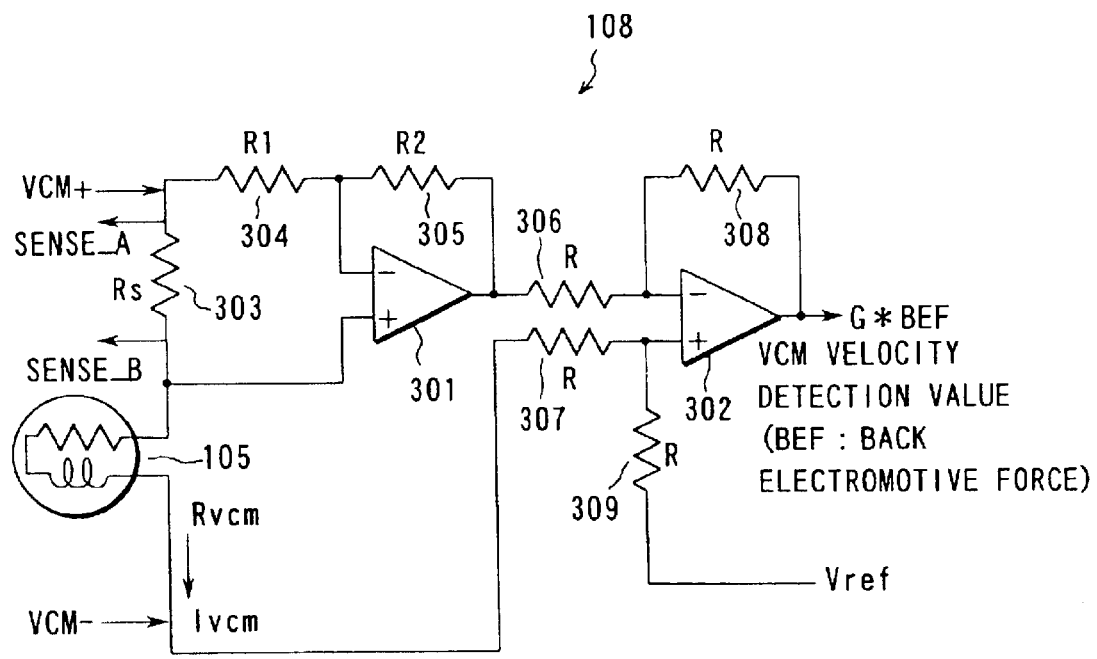
FIG. 3 is a circuit diagram showing the configuration of a VCM velocity detection circuit shown in FIG. 1.

The VCM velocity detection circuit 108 is connected to the VCM 105 and has a well-known circuit configuration as shown in FIG. 3, i.e., includes operational amplifiers 301 and 302 and resistors 303 to 309. The resistor 303 is a sense resistor and has resistance Rs. The resistors 304 and 305 have resistances R1 and R2, respectively. The resistors 306 to 309 have resistance R.

Referring to FIG. 3, a voltage Vvcm generated across the VCM 105 is represented by $$Vvcm = Rvcm * Ivcm + Lvcm * dI/dT + BEF \quad (1)$$

where Vvcm: voltage across VCM
Rvcm: VCM resistance
Ivcm: current flowing in VCM
Lvcm: VCM coil inductance
BEF: back electromotive force From equation (1) above, the back electromotive force BEF of the VCM 105 is calculated by $$BEF = Vvcm - Rvcm * Ivcm - Lvcm * dI/dT \quad (2)$$

Assuming that enough time has elapsed, $$Lvcm * dI/dT \approx 0 \quad (3)$$

Therefore, equation (2) is rewritten as $$BEF = Vvcm - Rvcm * Ivcm \quad (4)$$

Rvcm (VCM resistance) is calculated by $$Rvcm = Rvcm-25°C. * (1 + K\Delta T) \quad (5)$$

where Rvcm−25° C.: VCM resistance at room temperature 25° C.
K: temperature coefficient
ΔT: temperature change
Assume that Rvcm is calculated by $$Rvcm = Rs * R2/R1 \quad (6)$$

From this equation (6), the back electromotive force BEF is represented by $$BEF = -(Vvcm - Ivcm * Rs * R2/R1) + Vref \quad (7)$$

where Rs: sense resistance
Vref: reference voltage

That is, the back electromotive force BEF can be detected by equation (7).

Also, by using the back electromotive force BEF calculated by equation (7), VCM velocity corresponding to (proportional to) this back electromotive force BEF can be calculated by $$VCM \text{ velocity detection value} = G * BEF \quad (8)$$

where G: velocity reduction coefficient

The VCM velocity detection circuit 108 detects the VCM velocity detection value (G*BEF) determined by the back electromotive force BEF and the velocity reduction coefficient G. This velocity reduction coefficient G is the circuit gain of the VCM velocity detection circuit 108 and set at a value necessary to calculate the VCM velocity detection value from the back electromotive force BEF.

(The VCM velocity detection value corresponding to) the detection value of the back electromotive force with respect to the VCM current value at 0 velocity is supposed to be 0. However, a circuit error produces a difference between detection values of the back electromotive force with respect to the VCM current value (Ivcm) at zero (0) VCM velocity. This in large part because the VCM resistance Rvcm changes with temperature to produce a difference between the value (actual Rvcm) on the left side of equation (6) and the value (temporarily calculated Rvcm) of the right side of equation (6).

Figure 4:
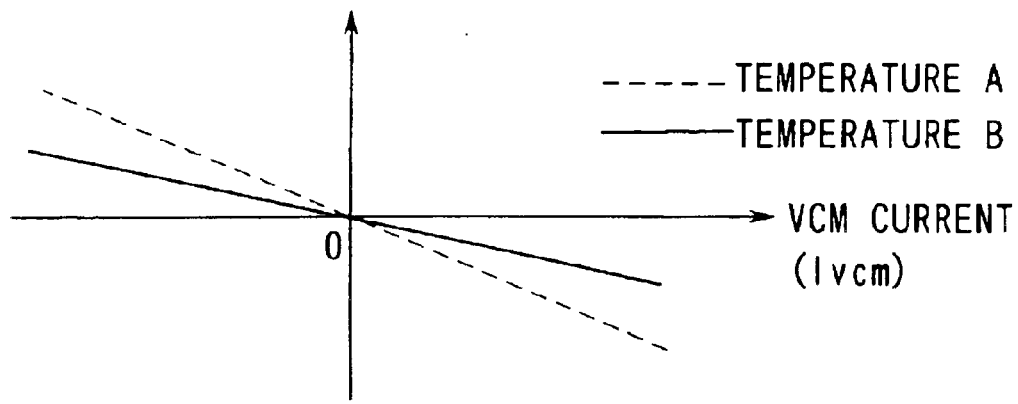
FIG. 4 is a graph showing the relationship between the VCM current value and the VCM velocity detection value at zero VCM velocity (corresponding to back electromotive force)

FIG. 4 shows the relationship between the VCM current value (Ivcm) and the detection value of the VCM velocity corresponding to the back electromotive force at zero VCM velocity for two temperatures A and B (A>B). Since FIG. 4 is a conceptual view, the VCM velocity detection value is 0 when Ivcm=0. However, this VCM velocity detection value is not generally 0 when Ivcm=0.

The VCM velocity corresponding to the back electromotive force at zero VCM velocity can be detected by the VCM velocity detection circuit 108 by fixing the carriage 103 in position and changing the VCM current.

Generally, a magnetic disk apparatus using a head loading/unloading system includes an inner-periphery stopper (not shown) for fixing the carriage 103 so that the head 102 does not depart from the innermost periphery of the disk 101, and an outer-periphery stopper (not shown) for fixing the carriage 103 so that the head 102 does not move outward past the predetermined position on the ramp 200 when the head 102 is unloaded on the ramp 200. Therefore, by changing the VCM current while the carriage 103 is pushed against the inner- or outer-periphery stopper, the VCM velocity (VCM velocity detection value) corresponding to the back electromotive force at zero VCM velocity can be detected.

Even when the current Ivcm flows through the VCM 105 while the carriage position is fixed, the back electromotive force BEF is supposed to be 0 (V) because the velocity is zero. However, the difference between Rvcm (=Rs*R2/R1) temporarily calculated by equation (6) and actual Rvcm produces a difference between the values of the left and right sides of equation (7). This difference produces a detection error in the VCM velocity value of equation (8) detected by the VCM velocity detection circuit 108 when Ivcm flows through the VCM 105 at zero velocity. Hence, the VCM velocity detection value must be corrected. Velocity feedback control can be accurately performed by correcting the VCM velocity detection value.

The CPU 113 can calculate the correction value (VCM velocity correction value) of the VCM velocity detection value as follows.

First, the CPU 113 drives the VCM 105 via the VCM driver 107 to unload the head 102 onto the ramp 200 and push the carriage 103 against the outer-periphery stopper. In this state, i.e., in a state where the velocity of the VCM 104 is zero, the CPU 113 allows the VCM velocity detection circuit 108 to detect the VCM velocity corresponding to the back electromotive force BEF of the VCM 105. The CPU 113 executes this operation by using a plurality of different values of the VCM current (Ivcm) supplied from the VCM driver 107 to the VCM 105. In this embodiment, the CPU 113 executes the operation by using two VCM current values A and B.

Figure 5:
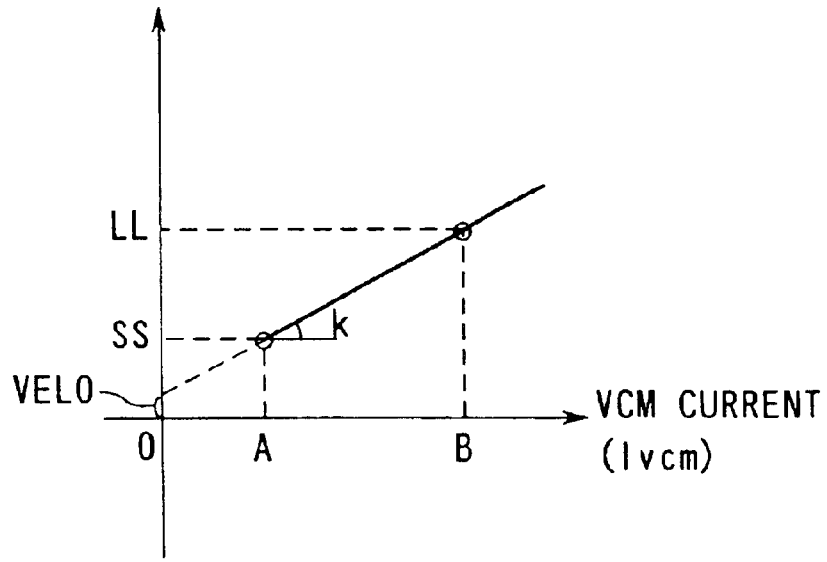
FIG. 5 is a graph for explaining a method of calculating the VCM velocity correction value.

Assuming the VCM velocity detection values (VEL) when Ivcm has the values A and B are SS and LL, respectively, as shown in FIG. 5, a slope k of a straight line representing the VCM current-zero velocity VCM velocity detection value characteristic is given by $$k=(LL-SS)/(B-A) \tag{9}$$

Accordingly, a VCM velocity detection value VEL0 when the VCM current is zero (Ivcm=0), i.e., a DC offset voltage VEL0 resulting from the circuit error in the VCM velocity detection circuit 108 is given by $$VEL0 = SS\{(LL - SS)/(B - A)\} \times (A - 0) \tag{10}$$
$$= SS - kA$$

A pair of DC offset voltage (VEL0) and slope k is called a VCM velocity correction value (calibration value). Also, the operation of calculating this VCM velocity correction value, i.e., the operation of calculating the VCM velocity correction value including the DC offset voltage (VEL0) and the slope k by supplying the VCM current having several (in this embodiment, two) different values to the VCM 105 while the carriage 103 is pushed against the inner- or outer-periphery stopper, i.e., while the velocity is zero, is called calibration (velocity correction value calibration).

To control loading/unloading of the head 102, the CPU 113 need only perform velocity feedback control by correcting the VCM velocity detection value as follows by using the VCM velocity correction value (VEL0, k) obtained by the above calibration.

First, the CPU 113 reads out the present VCM velocity detection value VEL from the VCM velocity detection circuit 103 via the A/D converter 116b.

Next, the CPU 113 subtracts the DC offset voltage VEL0 in the VCM velocity correction value from the VCM velocity detection value VEL.

The CPU 113 calculates a corrected present VCM velocity detection value VEL1 by $$VEL1=VEL-VEL0 \tag{11}$$

The CPU 113 calculates the previous VCM velocity (k*VCM current) from a VCM current (control current) supplied previous to the VCM 105 via the VCM driver 107 and k in the VCM velocity correction value, and calculates the difference between the previous VCM velocity and the present VCM velocity detection value VEL1 by $$VEL2=VEL1-k*(VCM\ current)- \tag{12}$$

thereby calculating a differential velocity VEL2.

The CPU 113 determines a control amount such that this differential velocity VEL2 is a target velocity. The CPU 113 outputs this control amount to the VCM driver 107 via the I/O interface 117 to cause the VCM driver 107 to supply a VCM current (control current) corresponding to the control amount to the VCM 105. This allows accurate velocity feedback in loading/unloading control.

If, however, the resistance (VCM resistance) of the coil of the VCM 105 changes due to temperature change or the like and this changes the relationship between the VCM current value and the VCM velocity detection value, the VCM velocity correction value described above becomes meaningless. In this embodiment, therefore, the CPU 113 detects any VCM resistance change due to temperature change or the like, which may change the relationship between the VCM current and the VCM velocity detection value. If such change is detected, the CPU 113 reexecutes the aforementioned calibration to update the velocity correction value.

The first to fourth calibration methods applicable to this embodiment will be described in order below.

(1-1) First Calibration Method

The first calibration method will be described with reference to flow charts in FIGS. 6A and 6B.

The CPU 113 receives a load instruction from the host apparatus and initializes and activates the timer 115 to start loading (following the load instruction from the host apparatus) by which the head 102 is moved from the ramp 200 onto the disk 101 in accordance with the instruction (step A1).

Next, the CPU 113 controls the VCM driver 107 to push the carriage 103 against the outer-periphery stopper. In this state, the CPU 113 causes the VCM driver 107 to supply to the VCM 105 a VCM current having, e.g., two current values A and B in a direction in which the driving force to the carriage 103 acts toward the outer periphery, thereby performing the calibration described above at zero velocity in this outer-periphery stopper position (step A2). That is, the CPU 113 reads out VCM velocity detection values SS and LL corresponding to the VCM current values A and B, respectively, from the VCM velocity detection circuit 108. The CPU 113 calculates the VCM velocity correction value including k given by equation (9) and the DC offset voltage VEL0 given by equation (10), and stores this VCM velocity correction value in a predetermined location of the memory 114.

The CPU 113 then performs loading control (step A3). That is, the CPU 113 reads out the VCM velocity detection value from the VCM velocity correction circuit 108 and moves the head 102 onto the disk 101 by performing velocity feedback while correcting the readout VCM velocity detection value on the basis of the present VCM velocity correction value.

In head position control (i.e., normal control) in which the head 102 is positioned in a target position on the disk 101, if the CPU 113 detects a ready state (step B1), the CPU 113 reads out and checks for the value (timer value) of the timer 115 (step B2).

If the timer value is smaller than a predetermined prescribed time, i.e., if the elapsed time from the previous (latest) calibration (in this method, the calibration during loading) has not reached the prescribed time, the CPU 113 determines that the temperature difference from the temperature in the previous calibration is small. So, the CPU 113 immediately returns to head positioning control.

If the timer value is equal to or larger than the prescribed time, i.e., if the elapsed time from the previous calibration is equal to or larger than the prescribed time, the CPU 113 determines that it is better to update the present VCM velocity correction value because the change in the VCM temperature from that in the previous calibration (in this method, the calibration during loading) may be large. If this is the case, the CPU 113 drives the VCM 105 to retract the head 102 toward, e.g., the inner periphery of the disk 101 and pushes the carriage 103 against the inner-periphery stopper (step B3).

In this state, the CPU 113 causes the VCM driver 107 to supply to the VCM 105 a VCM current having, e.g., two current values A and B in a direction in which the driving force to the carriage 103 acts toward the inner periphery. In this way, the CUP 113 performs calibration at zero velocity in the inner-periphery stopper position and updates the present VCM velocity correction value stored in the predetermined location of the memory 114 (step B4).

The CPU 113 initializes and reactivates the timer 115 (step B5), performs seeking to move the head 102 to the original head position (step B6), and returns to the normal head positioning control state. If the value of the timer 115 is equal to or larger than the prescribed time in this state, the flow advances to the processing from step B3, and the CPU 113 performs new calibration to update the VCM velocity correction value and reactivates the timer 115.

In the first calibration method as described above, if the prescribed time has elapsed from the previous calibration, new calibration is performed to update the VCM velocity correction value. That is, after loading the calibration is periodically performed to update the VCM velocity correction value. Therefore, even if the temperature difference may increase from the previous VCM temperature with the passage of time, the latest VCM velocity correction value reflecting the VCM temperature at that point can be used in unloading control. Accordingly, accurate unloading can be performed.

In the above explanation, the timer check starts when the ready state is detected in the head positioning control period. However, the timer check can also be preferentially performed when command processing is necessary, i.e., in a busy state.

(1-2) First Modification of First Calibration Method

Figure 7:
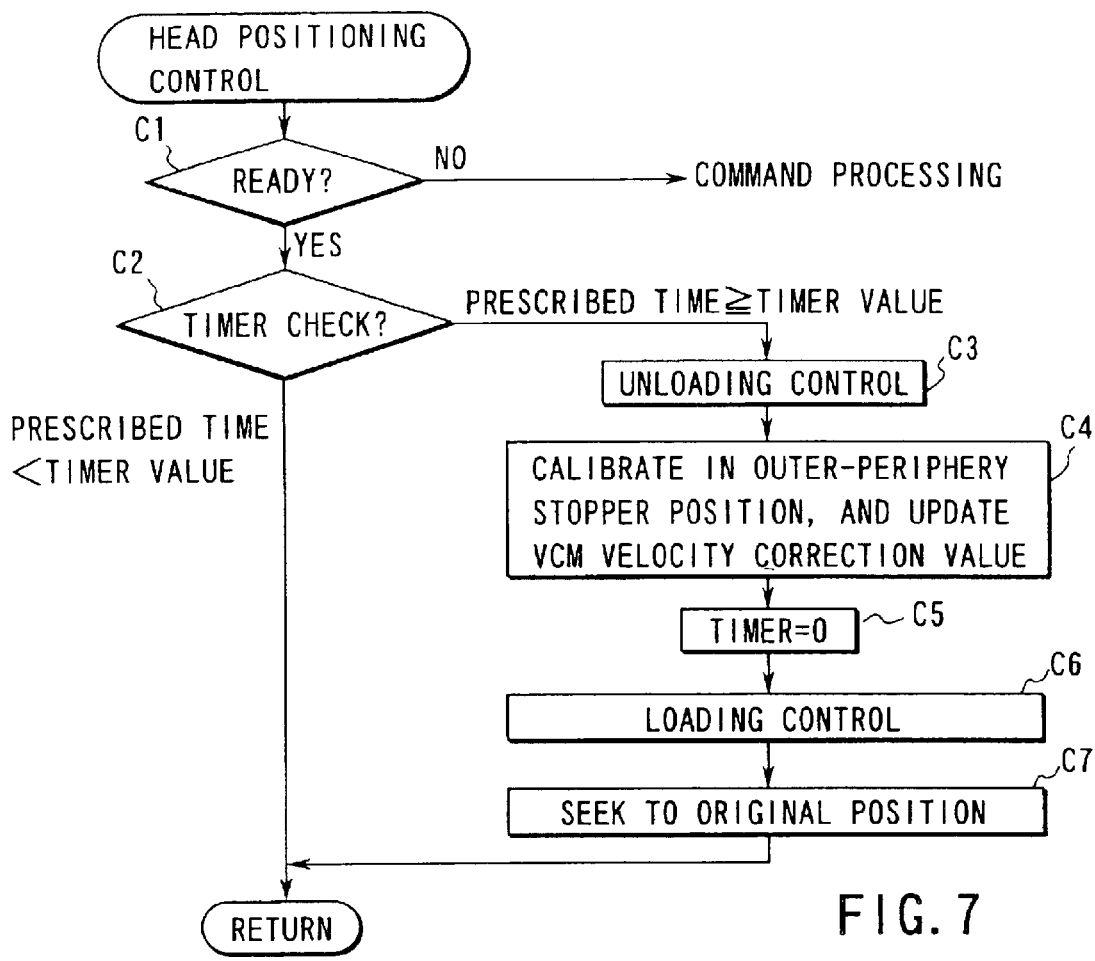
FIG. 7 is a flow chart for explaining the first modification of the first calibration method.

The first modification of the first calibration method will be described below with reference to a flow chart in FIG. 7. This first modification is characterized in that the calibration for updating the VCM velocity correction value after loading is performed in the outer-periphery stopper position, not in the inner-periphery stopper position.

Figure 6A:
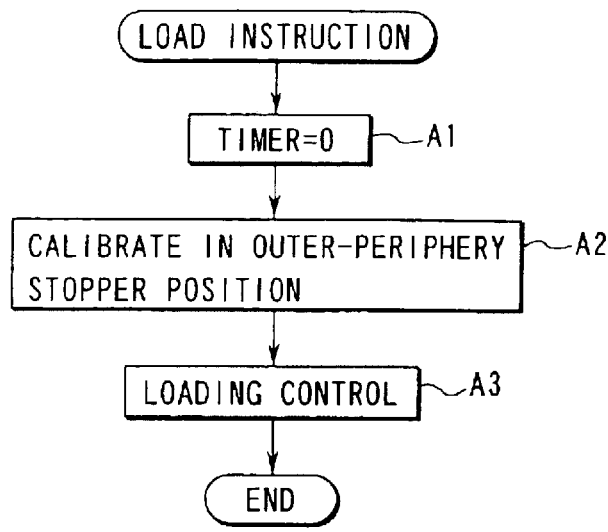
FIGS. 6A and 6B are flow charts for explaining the first calibration method in the embodiment.
Figure 6B:
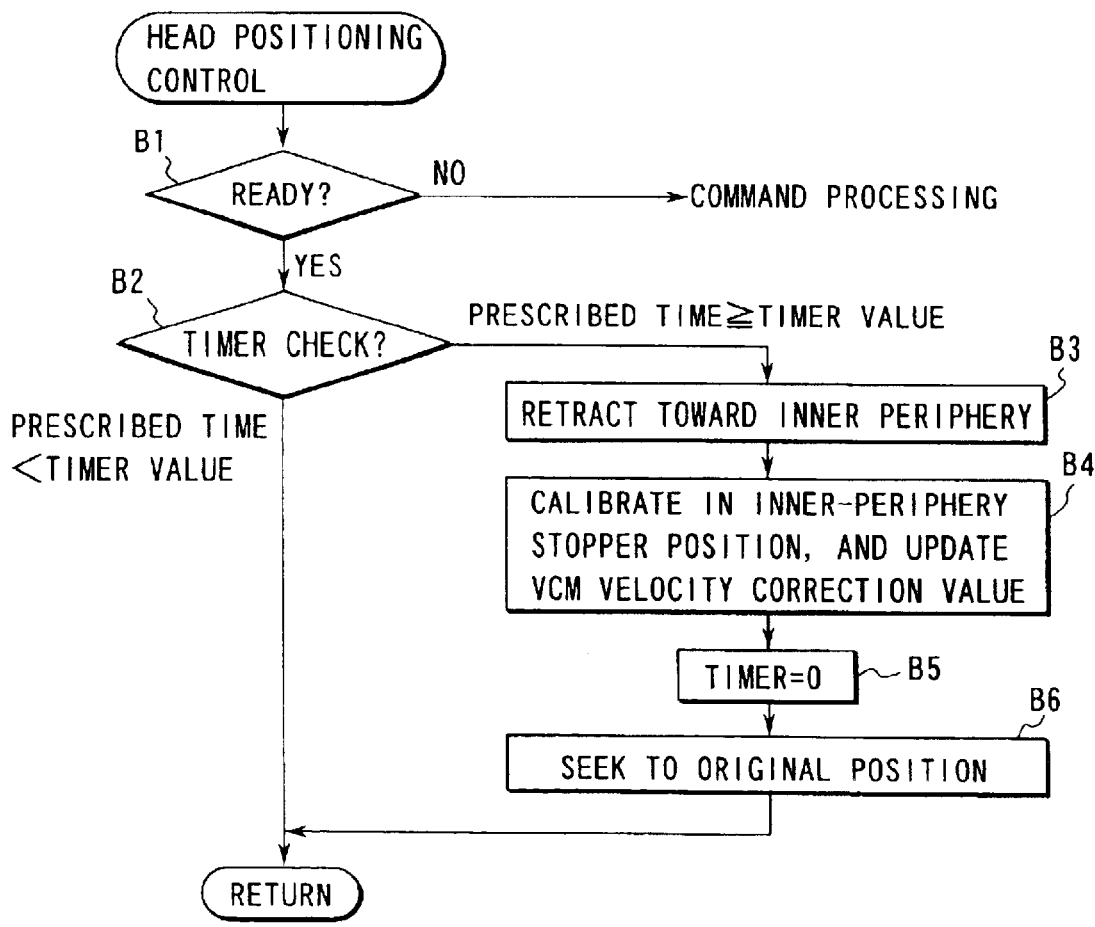

The process of loading is similar to that in the first calibration method and performed in accordance with the flow chart shown in FIG. 6A.

The following processing is performed in the period of head positioning control.

If the CPU 113 detects the ready state in the head positioning control state (step C1), the CPU 113 reads out and checks for the value of the timer 115 (step C2). If the timer value is smaller than the prescribed time, the CPU 113 determines that the temperature difference from the temperature in the previous calibration is small, and immediately returns to head positioning control.

If the timer value is equal to or larger than the prescribed time, the CPU 113 determines that it is better to update the present VCM velocity correction value because the temperature difference from the temperature in the previous calibration (in this modification, the calibration during loading) may be large. If this is the case, the CPU 113 performs unloading control by driving the VCM 105 to move the head 102 to the ramp 200, and pushes the carriage 103 against the outer-periphery stopper (stopper C3). In this unloading control, the CPU 113 uses the latest VCM velocity correction value calculated in the previous calibration (the prescribed time ago). So, accurate unloading can be expected. However, if the VCM velocity correction value is not updated by the following calibration, an error of this correction value may increase with the passage of time.

Accordingly, while the head 102 is unloaded and the carriage 103 is pushed against the outer-periphery stopper, the CPU 113 causes the VCM driver 107 to supply to the VCM 105 a VCM current having, e.g., two current values A and B in a direction in which the driving force to the carriage 103 acts toward the outer periphery. In this way, the CPU 113 performs calibration at zero velocity in the outer-periphery stopper position and updates the present VCM velocity correction value stored in the predetermined location of the memory 114 to the latest value (step C4).

The CPU 113 then initializes and reactivates the timer 115 (step C5). After that, the CPU 113 performs loading control by moving the head 102 from the ramp 200 onto the disk 101, and seeks to make the head 102 jump to the original head position (steps C6 and C7). After that, the CPU 113 returns to normal head positioning control.

(1-3) Second Modification of First Calibration Method

Figure 8:
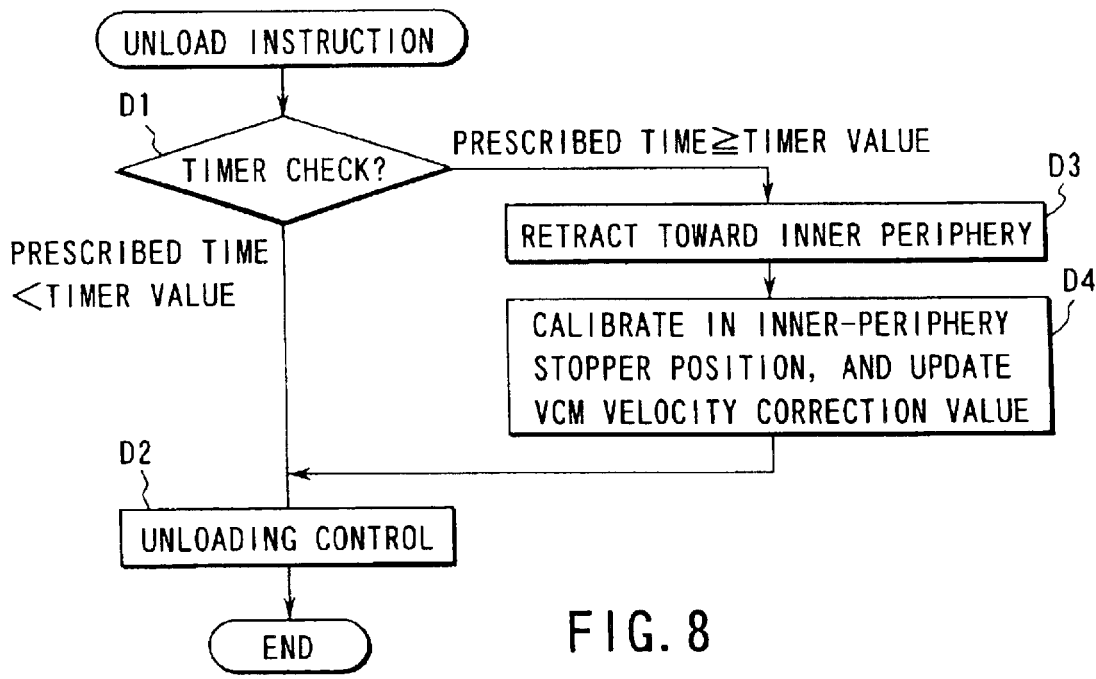
FIG. 8 is a flow chart for explaining the second modification of the first calibration method.

The second modification of the first calibration method will be described below with reference to a flow chart in FIG. 8. This second modification is characterized in that the timer check is performed in unloading control requiring the VCM velocity correction value, and the calibration for updating the VCM velocity correction value is performed in accordance with the check result.

The process of loading is similar to that in the first calibration method and performed in accordance with the flow chart shown in FIG. 6A. Also, the operation in the period of head positioning control is analogous to the conventional operation, i.e., neither timer check nor calibration based on the check result is performed.

The CPU 113 receives an unload instruction from the host apparatus and reads out and checks for the value of the timer 115 to start unloading by which the head 102 is moved from the disk 101 onto the ramp 200 in accordance with the unloading instruction (step D1). If the timer value is smaller than the prescribed time, the CPU 113 determines that the temperature difference from the temperature during loading is small and so updating of the VCM velocity correction value is unnecessary. Therefore, the CPU 113 immediately executes unloading control (step D2). In this unloading control, the CPU 113 uses the VCM velocity correction value calculated in the calibration during loading.

If the timer value is equal to or larger than the prescribed time, the CPU 113 determines that it is better to update the VCM velocity correction value because the temperature difference from the temperature during loading may be large. If this is the case, the CPU 113 drives the VCM 105 to retract the head 102 toward the inner periphery of the disk 101 and pushes the carriage 103 against the inner-periphery stopper (step D3).

In this state, the CPU 113 causes the VCM driver 107 to supply to the VCM 105 a VCM current having, e.g., two current values A and B in a direction in which the driving force to the carriage 103 acts toward the inner periphery. In this manner, the CPU 113 performs calibration at zero velocity in the inner-periphery stopper position and updates the VCM velocity correction value calculated during loading and stored in the predetermined location of the memory 114 (step D4).

The CPU 113 then executes unloading control by using this updated VCM velocity correction value (step D2).

(2-1) Second Calibration Method

The second calibration method will be described below with reference to FIGS. 9A and 9B. This second calibration method is characterized in that a change in the VCM temperature measured by the temperature sensor 119 is checked, and calibration for updating the VCM velocity correction value is performed in accordance with the check result.

To start loading (in accordance with a load instruction from the host apparatus) by which the head 102 is moved from the ramp 200 onto the disk 101, the CPU 113 reads out the VCM temperature, which is measured by the temperature sensor 119 and converted into digital data by the A/D converter 116b, and stores the readout VCM temperature in a predetermined location of the memory 114 (step E1).

Next, the CPU 113 controls the VCM driver 107 to push the carriage 103 against the outer-periphery stopper. In this state, the CPU 113 causes the VCM driver 107 to supply to the VCM 105 a VCM current having, e.g., two current values A and B in a direction in which the driving force to the carriage 103 acts toward the outer periphery, thereby performing the aforementioned calibration at zero velocity in this outer-periphery stopper position (step E2). That is, the CPU 113 reads out VCM velocity detection values SS and LL corresponding to the VCM current values A and B, respectively, from the VCM velocity detection circuit 108 (via the A/D converter 116a). The CPU 113 calculates the VCM velocity correction value including k given by equation (9) and the DC offset voltage VEL0 given by equation (10), and stores the calculated VCM velocity correction value in a predetermined location of the memory 114.

The CPU 113 then performs loading control (step E3). That is, the CPU 113 reads out the VCM velocity detection value from the VCM velocity detection circuit 108 and moves the head 102 onto the disk 101 by performing velocity feedback while correcting the readout VCM velocity detection value on the basis of the present VCM velocity correction value.

In head positioning control in which the head 102 is positioned in a target position on the disk 101, the CPU 113 reads out the measurement value of the VCM temperature measured by the temperature sensor 119 via the A/D converter 116b and looks up the VCM temperature during loading stored in the memory 114 (steps F1 and F2). The CPU 113 calculates a difference X between the two temperatures and compares the absolute value of this temperature difference with a predetermined prescribed value (prescribed temperature difference) (step F3).

If (the absolute value of) the difference between the present VCM temperature and the VCM temperature during loading is smaller than the prescribed temperature, the CPU 113 determines that the temperature difference from the temperature during loading is small, and immediately returns to head positioning control.

If (the absolute value of) the difference between the present VCM temperature and the VCM temperature during loading is equal to or larger than the prescribed temperature, the CPU 113 determines that it is better to update the present VCM velocity correction value because the temperature difference from the temperature during loading is large. If this is the case, the CPU 113 drives the VCM 105 to retract the head 102 toward, e.g., the inner periphery of the disk 101 and pushes the carriage 103 against the inner-periphery stopper. In this state, the CPU 113 causes the VCM driver 107 to supply to the VCM 105 a VCM current having, e.g., two current values A and B in a direction in which the driving force to the carriage 103 acts toward the inner periphery. In this way, the CPU 113 performs calibration at zero velocity in the inner-periphery stopper position and updates the present VCM velocity correction value stored in the predetermined location of the memory 114 to the latest value (step F4).

The CPU 113 then seeks to make the head 102 jump to the original head position (step F5) and returns to normal head positioning control.

Similar to the timer check in the first calibration method, the above VCM temperature check can also be performed when the ready state is detected.

(2-2) First Modification of Second Calibration Method

Figure 10:
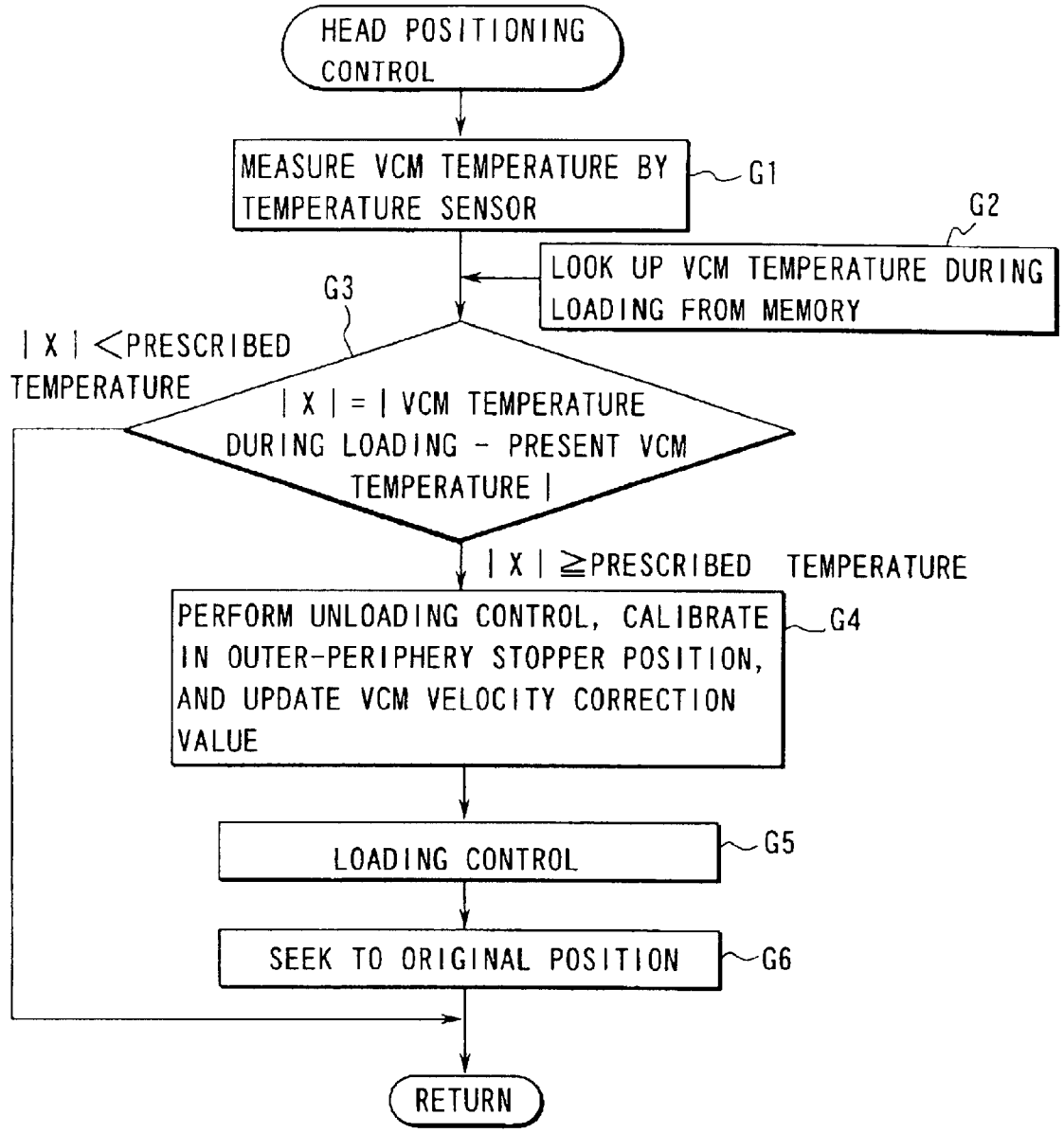
FIG. 10 is a flow chart for explaining the first modification of the second calibration method.

The first modification of the second calibration method will be described below with reference to a flow chart in FIG. 10. This first modification is characterized in that the calibration for updating the VCM velocity correction value after loading is performed in the outer-periphery stopper position, not in the inner-periphery stopper position.

Figure 9A:
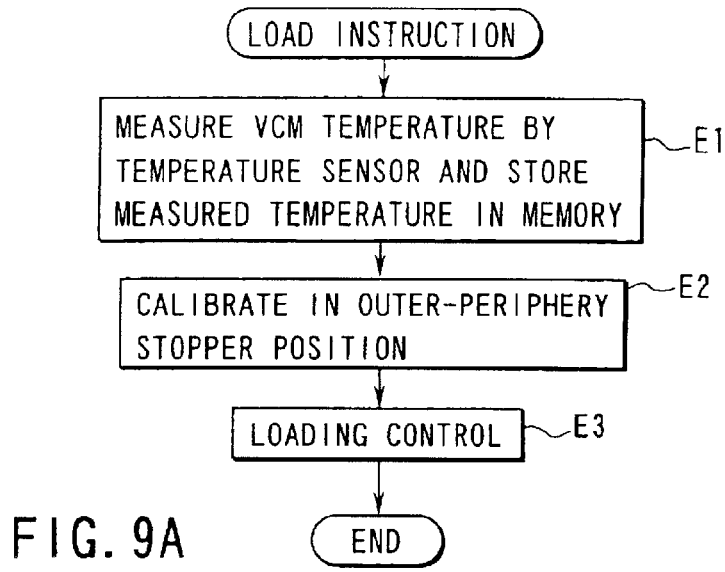
FIGS. 9A and 9B are flow charts for explaining the second calibration method in the embodiment.
Figure 9B:
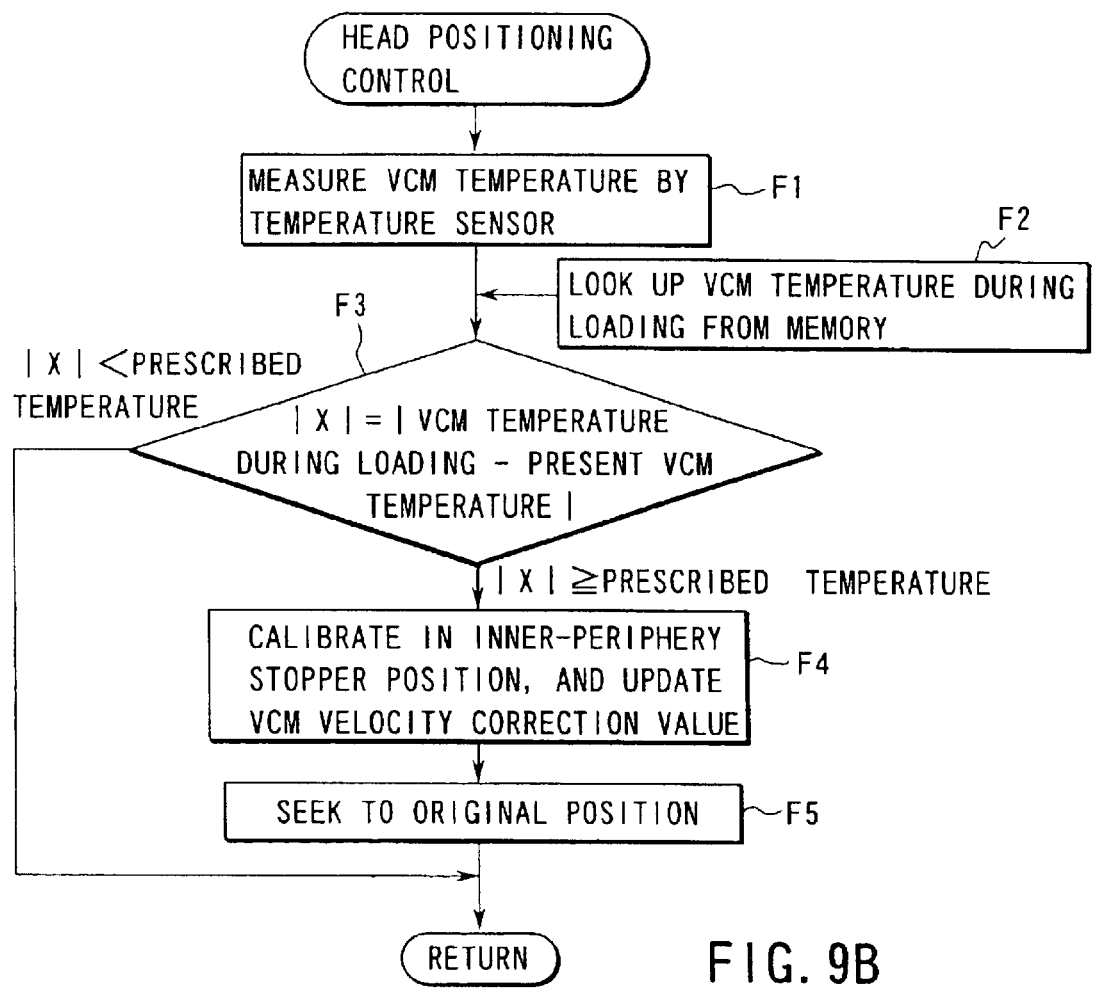

The process of loading is similar to that in the second calibration method and performed in accordance with the flow chart shown in FIG. 9A.

The following processing is performed in the period of head positioning control.

In this head positioning control, the CPU 113 reads out the measurement value of the VCM temperature measured by the temperature sensor 119 via the A/D converter 116b and looks up the VCM temperature during loading stored in the memory 114 (steps G1 and G2). The CPU 113 calculates the difference X between the two temperatures and compares the absolute value of this temperature difference with the predetermined prescribed temperature (step G3).

If (the absolute value of) the difference between the present VCM temperature and the VCM temperature during loading is smaller than the prescribed temperature, the CPU 113 determines that the temperature difference from the temperature during loading is small, and immediately returns to head positioning control.

If (the absolute value of) the difference between the present VCM temperature and the VCM temperature during loading is equal to or larger than the prescribed temperature, the CPU 113 determines that it is better to update the present VCM velocity correction value because the temperature difference from the temperature during loading is large. If this is the case, the CPU 113 performs unloading control by driving the VCM 105 to move the head 102 to the ramp 200, and pushes the carriage 103 against the outer-periphery stopper. In this state, the CPU 113 causes the VCM driver 107 to supply to the VCM 105 a VCM current having, e.g., two current values A and B in a direction in which the driving force to the carriage 103 acts toward the outer periphery. In this way, the CPU 113 performs calibration at zero velocity in the outer-periphery stopper position and updates the present VCM velocity correction value stored in the predetermined location of the memory 114 to the latest value (step G4).

The CPU 113 then performs loading control by moving the head 102 from the ramp 200 onto the disk 101, and seeks to make the head 102 jump to the original head position (steps G5 and G6). After that, the CPU 113 returns to normal head positioning control.

(2-3) Second Modification of Second Calibration Method

Figure 11:
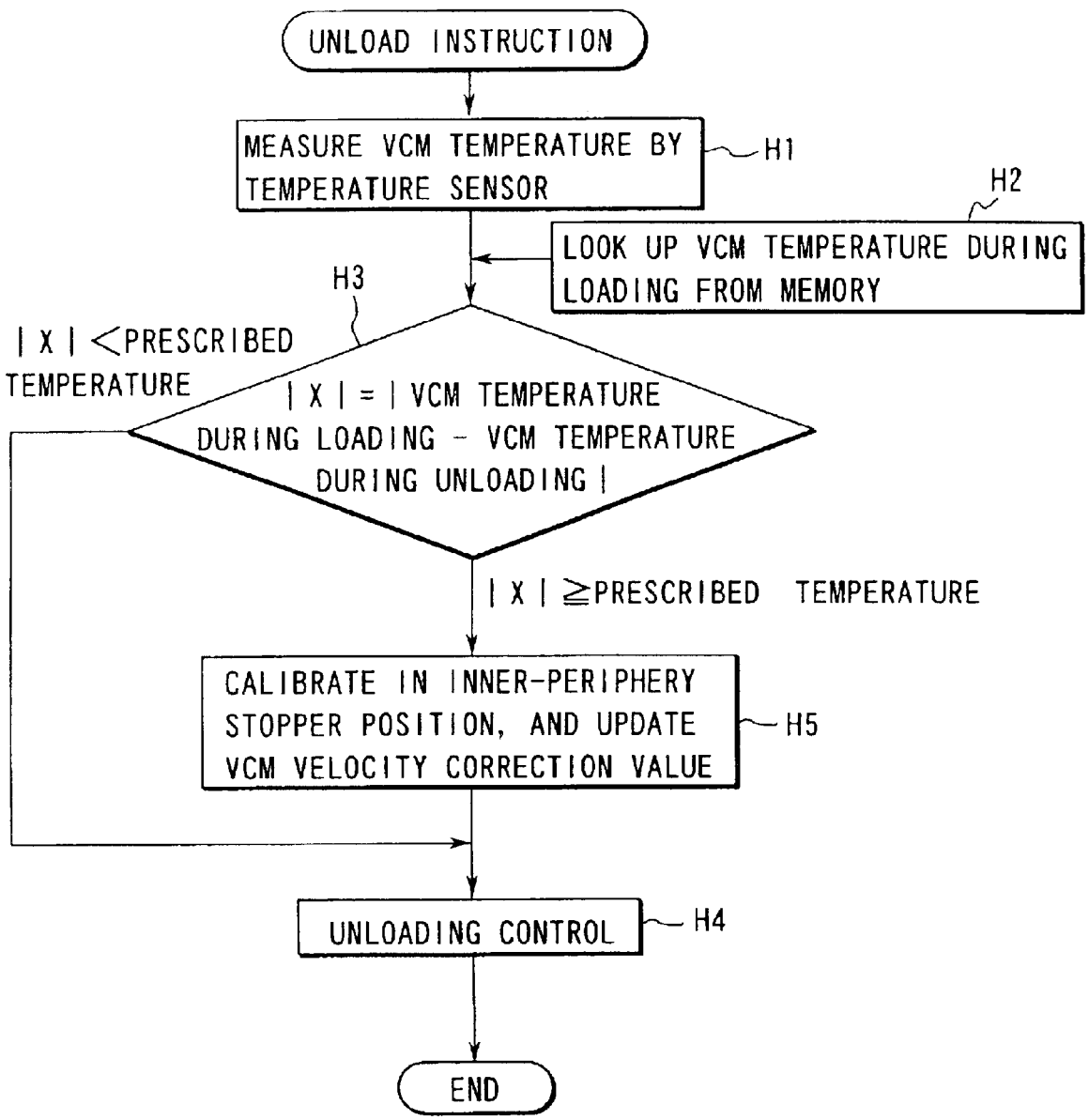
FIG. 11 is a flow chart for explaining the second modification of the second calibration method.

The second modification of the second calibration method will be described below with reference to a flow chart in FIG. 11. This second modification is characterized in that the VCM temperature check is performed in unloading control requiring the VCM velocity correction value, and the calibration for updating the VCM velocity correction value is performed in accordance with the check result.

The process of loading is similar to that in the second calibration method and performed in accordance with the flow chart shown in FIG. 9A. Also, the operation in the period of head positioning control is analogous to the conventional operation, i.e., neither VCM temperature check nor calibration based on the check result is performed.

To start unloading (in accordance with an unload instruction from the host apparatus) by which the head 102 is moved from the disk 101 onto the ramp 200, the CPU 113 reads out the measurement value of the VCM temperature measured by the temperature sensor 119 via the A/D converter 116b and looks up the VCM temperature during loading stored in the memory 114 (steps H1 and H2). The CPU 113 calculates the difference X between the two temperatures and compares the absolute value of this temperature difference with the predetermined prescribed value (step H3).

If (the absolute value of) the difference between the present VCM temperature, i.e., the VCM temperature during unloading and the VCM temperature during loading is smaller than the prescribed temperature, the CPU 113 determines that the temperature difference from the temperature during loading is small and so updating of the VCM velocity correction value is unnecessary, and immediately executes unloading control (step H4). In this unloading control, the CPU 113 uses the VCM velocity correction value calculated in the calibration during loading.

If (the absolute value of) the difference between the present VCM temperature and the VCM temperature during loading is equal to or larger than the prescribed value, the CPU 113 determines that it is better to update the VCM velocity correction value because the temperature difference from the temperature during loading may be large. If this is the case, the CPU 113 drives the VCM 105 to retract the head 102 toward, e.g., the inner periphery of the disk 101, and pushes the carriage 103 against the inner-periphery stopper. In this state, the CPU 113 causes the VCM driver 107 to supply to the VCM 105 a VCM current having, e.g., two current values A and B in a direction in which the driving force to the carriage 103 acts toward the inner periphery. In this manner, the CPU 113 performs calibration at zero velocity in the inner-periphery stopper position and updates the present VCM velocity correction value stored in the predetermined location of the memory 114 to the latest value (step H5).

The CPU 113 then executes unloading control by using this updated VCM velocity correction value.

(3-1) Third Calibration Method

The third calibration method will be described below with reference to flow charts in FIGS. 12A and 12B. This third calibration method is characterized in that a change in the VCM velocity measured by the VCM velocity detection circuit 108 is checked, and calibration for updating the VCM velocity correction value is performed in accordance with the check result.

To start loading (in accordance with a load instruction from the host apparatus) by which the head 102 is moved from the ramp 200 onto the disk 101, the CPU 113 controls the VCM driver 107 to push the carriage 103 against the outer-periphery stopper. In this state, the CPU 113 causes the VCM driver 107 to supply to the VCM 105 a VCM current having, e.g., two current values A and B in a direction in which the driving force to the carriage 103 acts toward the outer periphery, thereby performing calibration at zero velocity in this outer-periphery stopper position (step I1). In this processing, the CPU 113 calculates the above-mentioned VCM velocity correction value and stores it in a predetermined location of the memory 114.

Next, the CPU 113 performs loading control (step I2). That is, the CPU 113 reads out the VCM velocity detection value from the VCM velocity detection circuit 108 and moves the head 102 onto the disk 101 by performing velocity feedback while correcting the readout VCM velocity detection value on the basis of the present VCM velocity correction value.

When this loading control is complete, the CPU 113 advances to on-track control by which the head 102 is positioned in a target position on the disk 101. That is, the CPU 113 reads out the VCM velocity detection value from the VCM velocity detection circuit 108 immediately after the loading control is switched to the on-track control, and stores the readout value in a predetermined location of the memory 114 (step I3).

In head positioning control (on-track control) by which the head 102 is positioned in the target position on the disk 101, the CPU 113 reads out (monitors) the VCM velocity detection value detected by the VCM velocity detection circuit 108 via the A/D converter 116b and looks up the VCM velocity detection value during loading stored in the memory 114 (steps J1 and J2). The CPU 113 calculates a difference V between the two velocity detection values and compares the absolute value of this velocity difference with a predetermined prescribed value (step J3).

If (the absolute value of) the present VCM velocity detection value and the VCM velocity detection value during loading is smaller than the prescribed value, the CPU 113 determines that the detection error in the VCM velocity detection circuit 108 is small, and immediately returns to head positioning control.

If (the absolute value of) the present VCM velocity detection value and the VCM velocity detection value during loading is equal to or larger than the prescribed value, the CPU 113 determines that it is better to update the present VCM velocity correction value because the detection error in the VCM velocity detection circuit 108 is large. If this is the case, the CPU 113 drives the VCM 105 to retract the head 102 toward, e.g., the inner periphery of the disk 101, and pushes the carriage 103 against the inner-periphery stopper. In this state, the CPU 113 causes the VCM driver 107 to supply to the VCM 105 a VCM current having, e.g., two current values A and B in a direction in which the driving force to the carriage 103 acts toward the inner periphery. In this way, the CPU 113 performs calibration at zero velocity in the inner-periphery stopper position and updates the present VCM velocity correction value stored in the predetermined location of the memory 114 to the latest value (step J4).

The CPU 113 then seeks to make the head 102 jump to the original head position (step J5) and returns to normal head positioning control.

Similar to the timer check in the first calibration method, the above VCM velocity detection value check can also be performed when the ready state is detected.

(3-2) First Modification of Third Calibration Method

Figure 13:
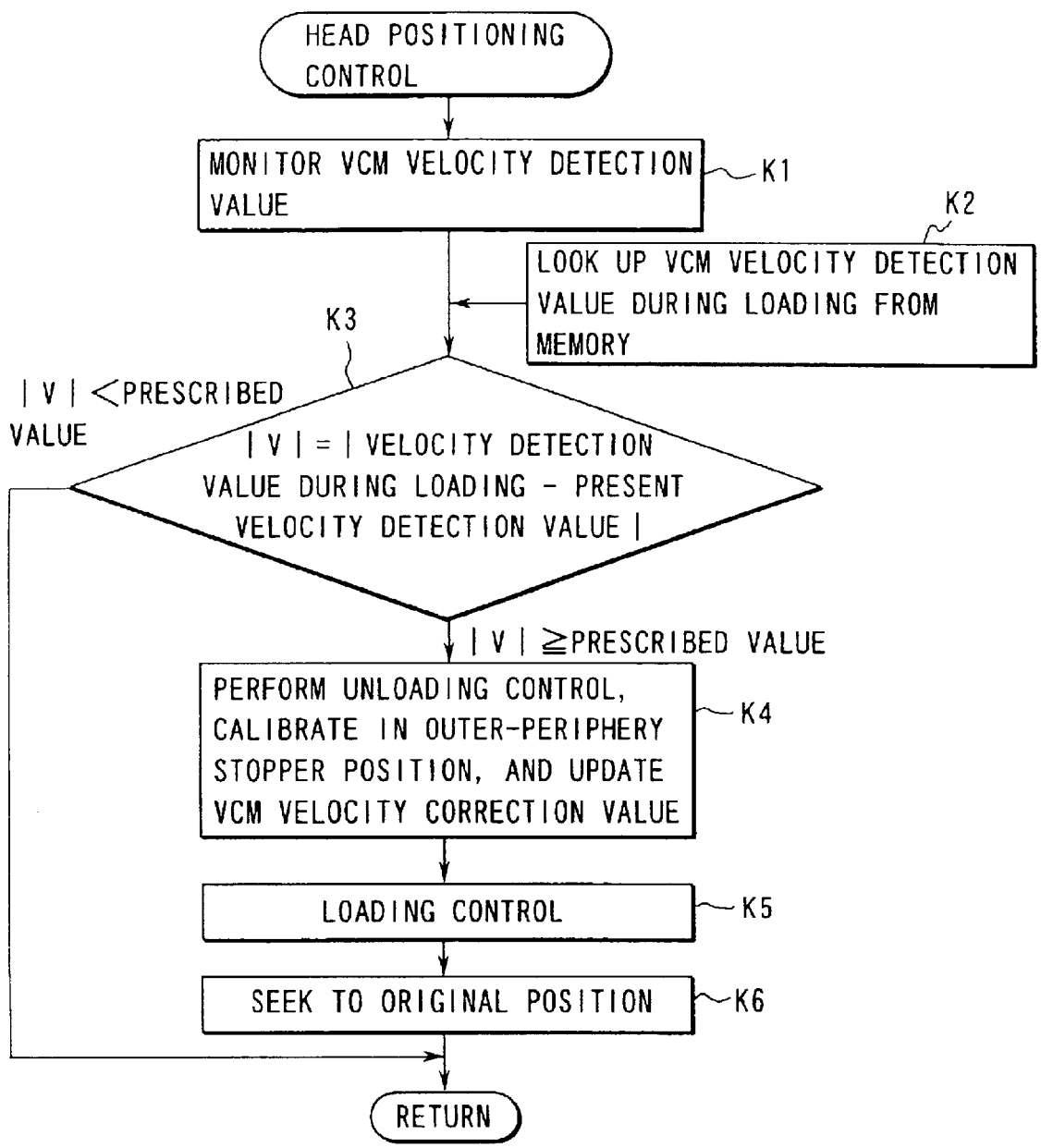
FIG. 13 is a flow chart for explaining the first modification of the third calibration method.

The first modification of the third calibration method will be described below with reference to a flow chart in FIG. 13. This first modification is characterized in that the calibration for updating the VCM velocity correction value after loading is performed in the outer-periphery stopper position, not in the inner-periphery stopper position.

Figure 12A:
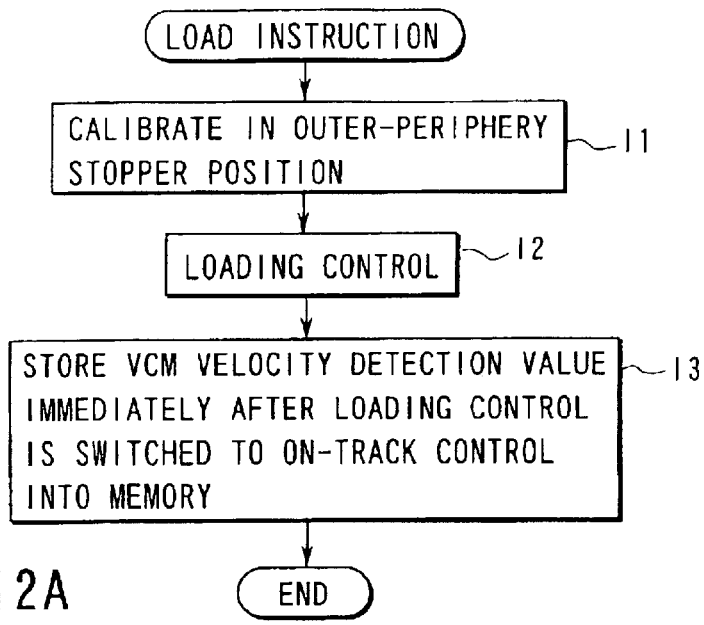
FIGS. 12A and 12B are flow charts for explaining the third calibration method in the embodiment.
Figure 12B:
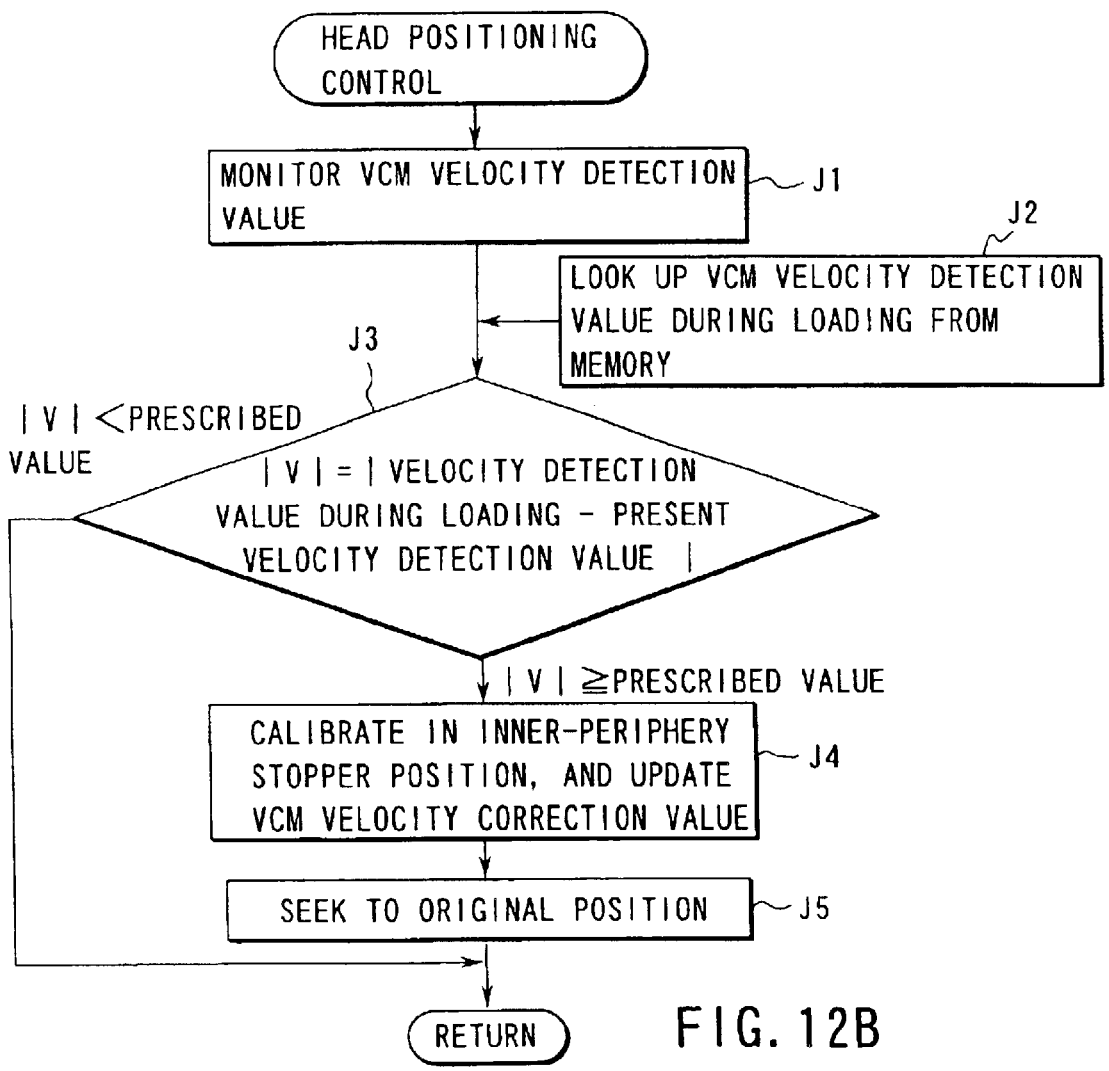

The process of loading is analogous to that in the third calibration method and performed in accordance with the flow chart shown in FIG. 12A.

The following processing is performed in the period of head positioning control.

In this head positioning control, the CPU 113 reads out the VCM velocity detection value detected by the VCM velocity detection circuit 108 via the A/D converter 116b and looks up the VCM velocity detection value during loading stored in the memory 114 (steps K1 and K2). The CPU 113 calculates the difference V between the two velocity detection values and compares the absolute value of this velocity difference with the predetermined prescribed value (step K3).

If (the absolute value of) the present VCM velocity detection value and the VCM velocity detection value during loading is smaller than the prescribed value, the CPU 113 determines that the detection error in the VCM velocity detection circuit 108 is small, and immediately returns to head positioning control.

If (the absolute value of) the present VCM velocity detection value and the VCM velocity detection value during loading is equal to or larger than the prescribed value, the CPU 113 determines that it is better to update the present VCM velocity correction value because the detection error in the VCM velocity detection circuit 108 is large. If this is the case, the CPU 113 performs unloading control by driving the VCM 105 to move the head 102 to the ramp 200, and pushes the carriage 103 against the outer-periphery stopper. In this state, the CPU 113 causes the VCM driver 107 to supply to the VCM 105 a VCM current having, e.g., two current values A and B in a direction in which the driving force to the carriage 103 acts toward the outer periphery. In this way, the CPU 113 performs calibration at zero velocity in the outer-periphery stopper position and updates the present VCM velocity correction value stored in the predetermined location of the memory 114 to the latest value (step K4).

The CPU 113 then performs loading control by moving the head 102 from the ramp 200 onto the disk 101 and seeks to make the head 102 jump to the original head position (steps K5 and K6). After that, the CPU 113 returns to normal head positioning control.

(3-3) Second Modification of Third Calibration Method

Figure 14:
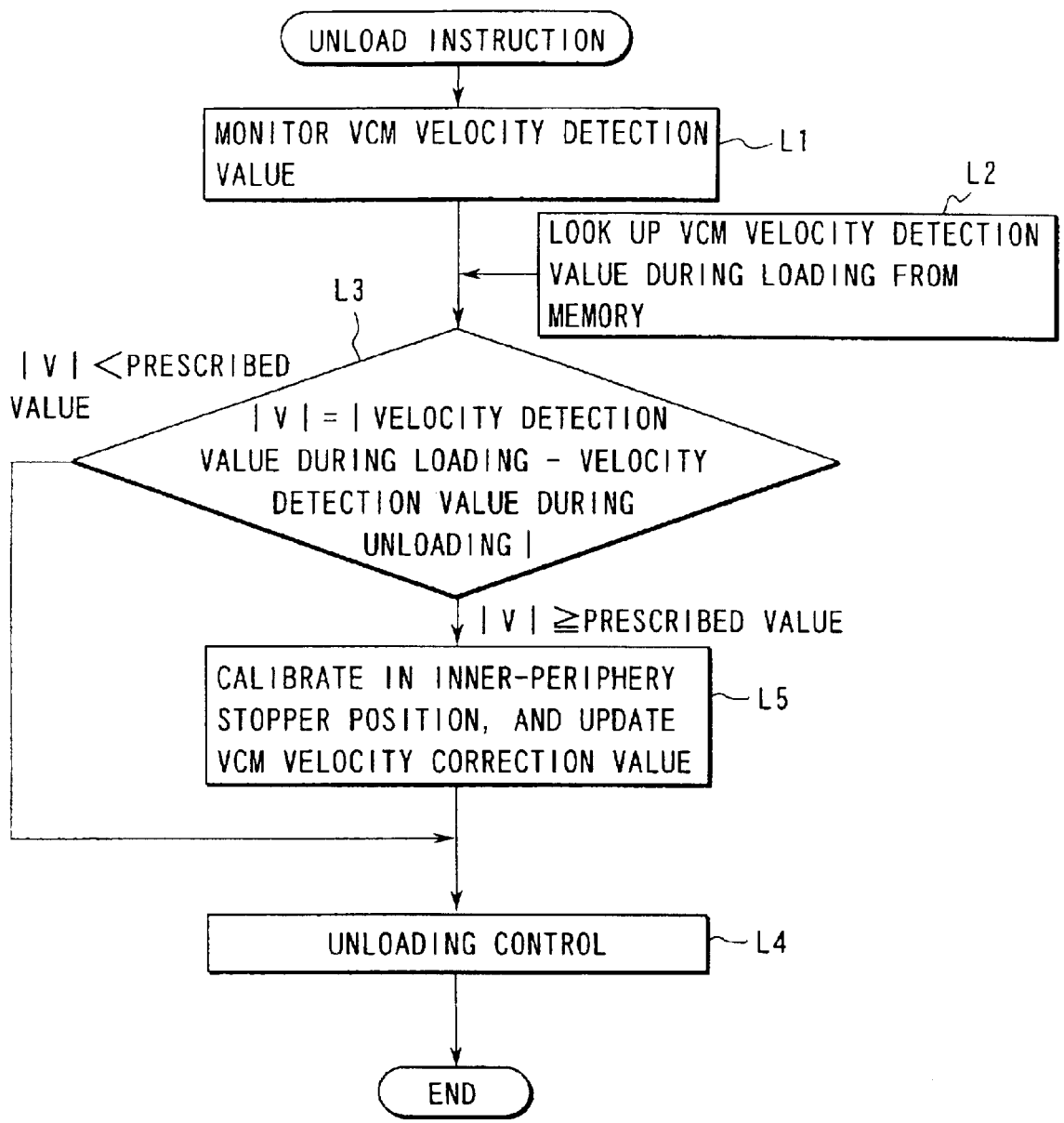
FIG. 14 is a flow chart for explaining the second modification of the third calibration method.

The second modification of the third calibration method will be described below with reference to a flow chart in FIG. 14. This second modification is characterized in that the VCM velocity detection value check is performed in unloading control requiring the VCM velocity correction value, and the calibration for updating the VCM velocity correction value is performed in accordance with the check result.

The process of loading is similar to that in the third calibration method and performed in accordance with the flow chart shown in FIG. 12A, Also, the operation in the period of head positioning control is similar to the conventional operation. That is, neither VCM velocity detection value check nor calibration based on the check result is performed.

To start unloading (in accordance with an unloading instruction from the host apparatus) by which the head 102 is moved from the disk 101 onto the ramp 200, the CPU 113 reads out the VCM velocity detection value detected by the VCM velocity detection circuit 108 via the A/D converter 116b and looks up the VCM velocity detection value during loading stored in the memory 114 (steps L1 and L2). The CPU 113 calculates the difference V between the two velocity detection values and compares the absolute value of this velocity difference with the predetermined prescribed value (step L3).

If (the absolute value of) the present VCM velocity detection value and the VCM velocity detection value during loading is smaller than the prescribed value, the CPU 113 determines that the detection error in the VCM velocity detection circuit 108 is small, and immediately executes unloading control (step L4). In this unloading control, the CPU 113 uses the VCM velocity correction value calculated in the calibration during loading.

If (the absolute value of) the present VCM velocity detection value and the VCM velocity detection value during loading is equal to or larger than the prescribed value, the CPU 113 determines that it is better to update the present VCM velocity correction value because the detection error in the VCM velocity detection circuit 108 is large. If this is the case, the CPU 113 drives the VCM 105 to retract the head 102 toward, e.g., the inner periphery of the disk 101, and pushes the carriage 103 against the inner-periphery stopper. In this state, the CPU 113 causes the VCM driver 107 to supply to the VCM 105 a VCM current having, e.g., two current values A and B in a direction in which the driving force to the carriage 103 acts toward the inner periphery. In this way, the CPU 113 performs calibration at zero velocity in the inner-periphery stopper position and updates the present VCM velocity correction value stored in the predetermined location of the memory 114 to the latest value (step L5).

The CPU 113 then executes unloading control by using this updated VCM velocity correction value.

(4) Fourth Calibration Method

Figure 15:
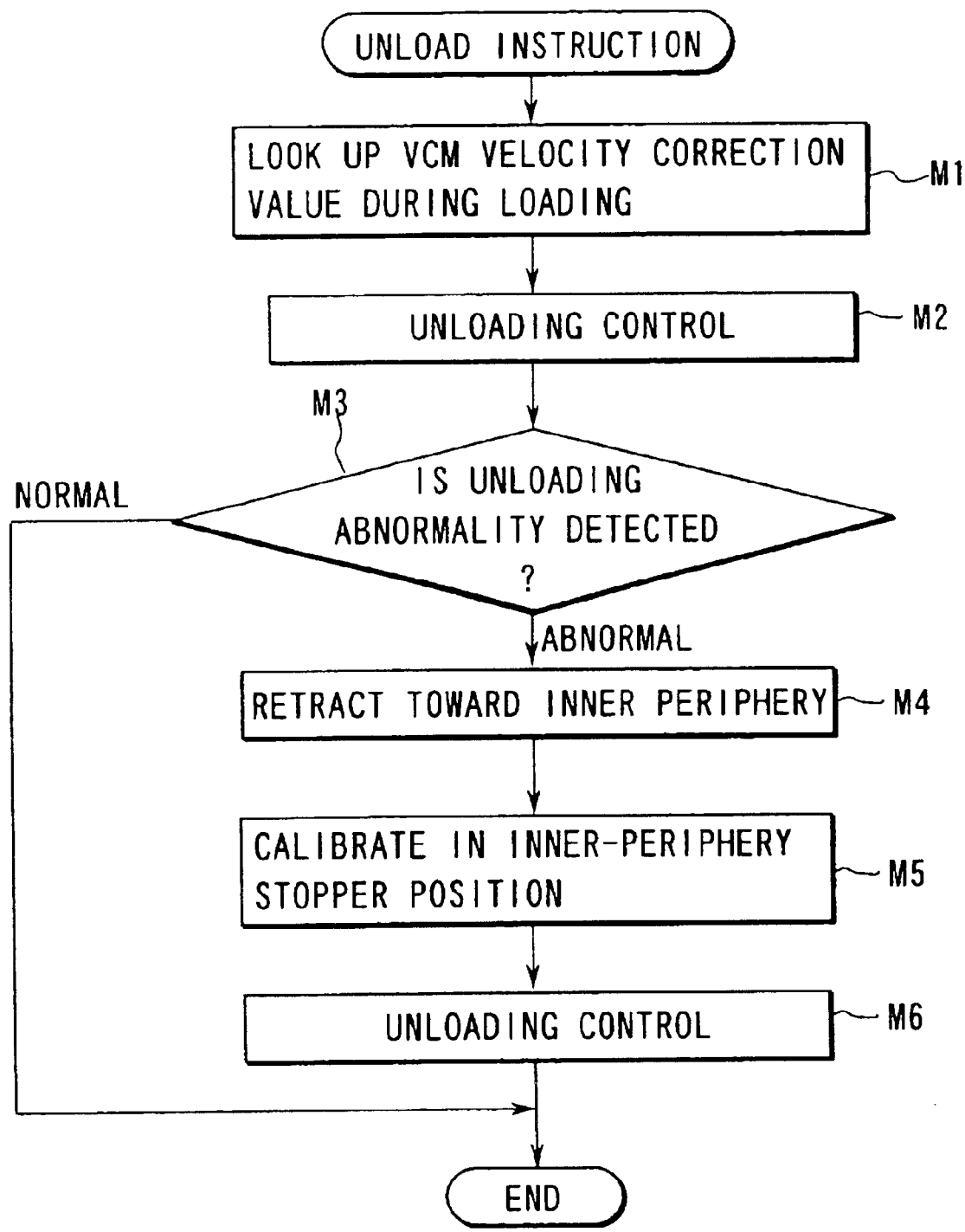
FIG. 15 is a flow chart for explaining the fourth calibration method in the embodiment.

The fourth calibration method will be described below with reference to a flow chart in FIG. 15. This fourth calibration method is characterized in that the normality/abnormality of unloading is checked during unloading control, calibration for updating the VCM velocity correction value is performed on the basis of the check result, and unloading control is again performed by using the updated VCM velocity correction value.

The process of loading is similar to that in the first calibration method and performed in accordance with the flow chart shown in FIG. 6A.

When receiving an unload instruction from the host apparatus, the CPU 113 looks up the VCM velocity correction value during loading stored in the memory 114 (step M1) and executes unloading control by which the head 102 is moved onto the ramp 200 (step M2).

Figure 16A:
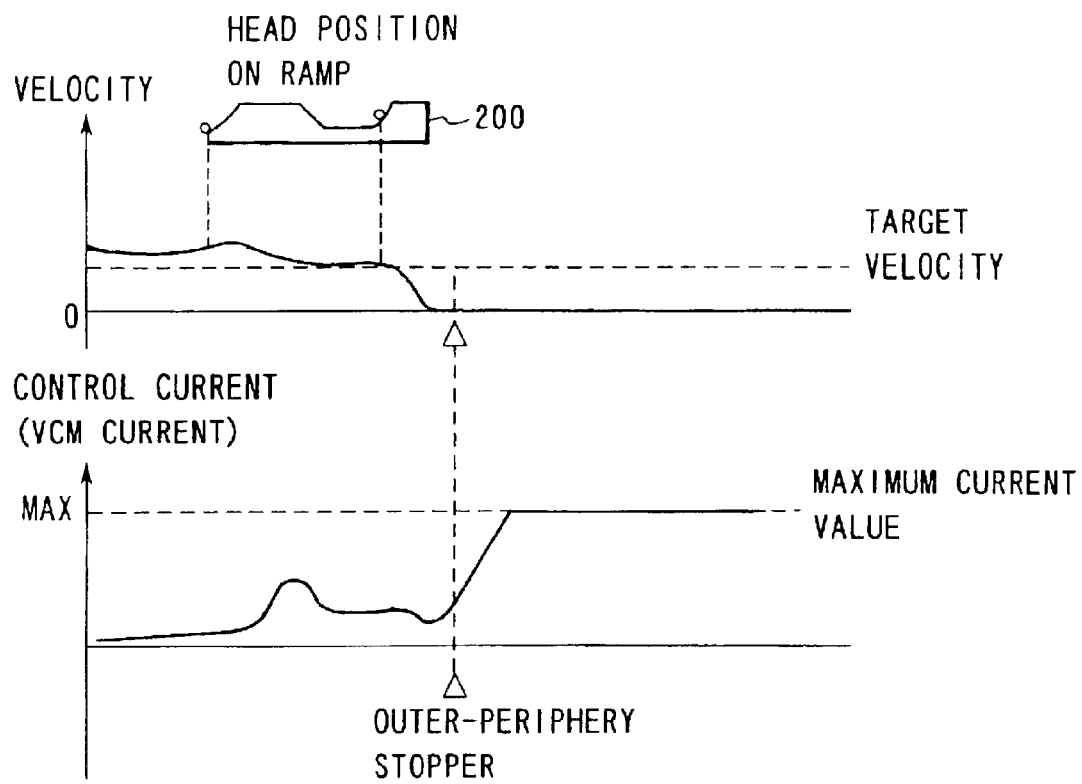
FIGS. 16A and 16B are graphs for explaining a method of determining the normality/abnormality of unloading used in the fourth calibration method.

In this unloading control, as shown in FIG. 16A, velocity feedback control is performed such that the target velocity is fixed. If the VCM velocity detection circuit 108 accurately detects the VCM velocity, the VCM velocity detection value is 0 when the carriage 103 abuts against the outer-periphery stopper. In velocity feedback control, on the other hand, the CPU 113 so moves the head 102 as to obtain the target velocity and hence supplies a control current (VCM current) having a maximum current value to the VCM 105. Accordingly, the control current has substantially the maximum current value if the carriage 103 has reached the outer-periphery stopper position during unloading control.

Figure 16B:
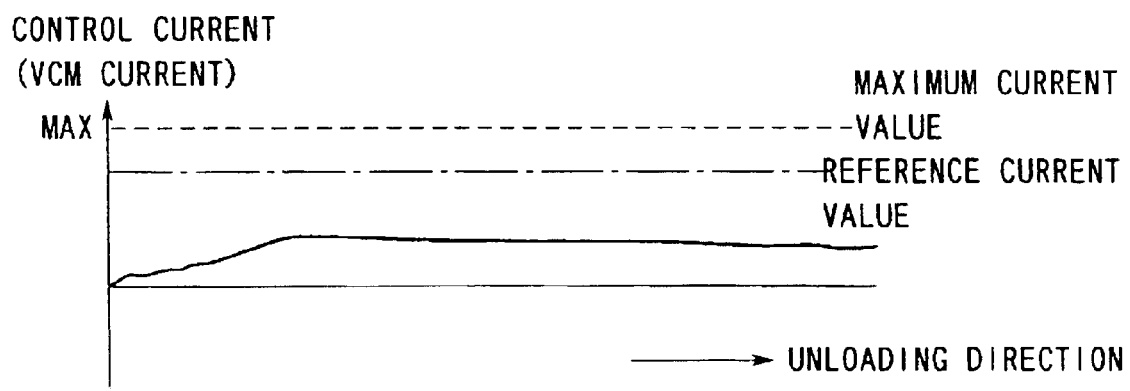

If, however, the CPU 113 determines that the detection error of the VCM velocity detection value in the VCM velocity detection circuit 108 is large and the difference from the target velocity is small, a control current having a small current value may be supplied as shown in FIG. 16B, i.e., an enough control current to move the head 102 to the head stop position on the ramp 200 may not be supplied. If this is the case, unloading abnormality may occur in which (the end portion of the suspension 103a for supporting) the head 102 stops on the inclined portion 201 of the ramp 200 instead of sliding upward along the inclined portion 201.

In this fourth calibration method, therefore, at the timing at which unloading control is presumably complete in normal state, the CPU 113 checks whether the control current for the VCM 105, which the CPU 113 determines in velocity feedback control, has reached a predetermined reference current value, thereby checking the normality/abnormality of unloading (step M3). The timing of this check is determined by adding a certain margin on the basis of the distribution of time necessary for unloading control, which is experimentally obtained. Also, the reference current value is determined from the maximum current value described above. In this embodiment, the reference current value is 80% of the maximum current value.

If the control current (VCM current) has a reference current value or more at the timing of the above check and the CPU 113 determines in step M3 that the unloading is normal, the CPU 113 immediately completes the unloading control.

If the control current (VCM current) is smaller than the reference current value at the timing of the check and the CPU 113 determines in step M3 that the unloading is abnormal, the CPU 113 retracts the head 102 toward the inner periphery of the disk 101 and pushes the carriage 103 against the inner-periphery stopper (step M4). In this state, the CPU 113 performs calibration in the inner-periphery stopper position and updates the VCM velocity correction value stored in the predetermined position of the memory 114 to the latest value (step M5). The CPU 113 then reexecutes the unloading control by using the updated VCM velocity correction value (step M6).

In the above description, the present invention is applied to a magnetic disk apparatus. However, the present invention is similarly applicable to any other disk apparatus, such as a magnetooptical disk apparatus, than a magnetic disk apparatus, which uses a head loading/unloading system.

Also, the various calibration methods described above can also be selectively combined where necessary.

In the present invention as has been described in detail above, the velocity correction value for correcting any error of the VCM velocity detection value resulting from temperature change or the like is acquired on the basis of the VCM velocity detection value detected by the VCM velocity detection circuit while the actual velocity of the VCM is zero. This improves the accuracy of this velocity correction value and the detection accuracy of the VCM velocity. Consequently, accurate velocity feedback control can be performed during loading/unloading.

Furthermore, in the present invention a VCM resistance change due to temperature change or the like, which may change the relationship between the VCM current value and the VCM velocity detection value is detected. If such change is detected, the velocity correction value is again acquired by reexecuting the calibration while the actual velocity of the VCM is zero. Since this further improves the detection accuracy of the VCM velocity, more accurate velocity feedback control can be performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A calibration method for use in a head loading/unloading type disk apparatus having a voice coil motor for driving a carriage to move a head in a direction of radius of a disk, a voice coil motor velocity detection circuit for detecting a voice coil motor velocity corresponding to a back electromotive force of the voice coil motor, and a ramp mechanism arranged outside an outer periphery of the disk to retract the head, comprising the steps of:

executing, at the start of loading control for loading the head from the ramp mechanism onto the disk, calibration for correcting a relationship between a value of a voice coil motor current flowing through the voice coil motor and the voice coil motor velocity detection value detected by the voice coil motor velocity detection circuit, said calibration being executed by obtaining a voice coil motor velocity detection value detected by the voice coil motor velocity detection circuit in a state where an actual velocity of the voice coil motor is set to zero and a current is supplied to the voice coil motor;

reading out the voice coil motor velocity detection value immediately after loading control is switched to on-track control from the voice coil motor velocity detection circuit and storing the readout value in a memory; and monitoring the voice coil motor velocity detection value detected by the voice coil motor velocity detection circuit while the head is positioned on the disk and, if an absolute value of a difference between the monitored voice coil motor velocity detection value and the voice coil motor velocity detection value stored in said memory is not less than a prescribed value, reexecuting said calibration.

2. A method according to claim 1, wherein if the absolute value of the difference between the monitored voice coil motor velocity detection value and the voice coil motor velocity detection value stored in said memory is not less than the prescribed value, the carriage is moved to an inner-periphery stopper position to reexecute said calibration.

3. A method according to claim 1, wherein if the absolute value of the difference between the monitored voice coil motor velocity detection value and the voice coil motor velocity detection value stored in said memory is not less than the prescribed value, unloading is performed and the carriage is moved to an outer-periphery stopper position to reexecute said calibration, and reloading is performed after the reexecution.

4. A calibration method for use in a head loading/unloading type disk apparatus having a voice coil motor for driving a carriage to move a head in a direction of radius of a disk, a voice coil motor velocity detection circuit for detecting a voice coil motor velocity corresponding to a back electromotive force of the voice coil motor, and a ramp mechanism arranged outside an outer periphery of the disk to retract the head, comprising the steps of:

executing, at the start of loading control for loading the head from the ramp mechanism onto the disk, calibration for correcting a relationship between a value of a voice coil motor current flowing through the voice coil motor and the voice coil motor velocity detection value detected by the voice coil motor velocity detection circuit, said calibration being executed by obtaining a voice coil motor velocity detection value detected by the voice coil motor velocity detection circuit in a state where an actual velocity of the voice coil motor is set to zero and a current is supplied to the voice coil motor;

reading out the voice coil motor velocity detection value immediately after loading control is switched to on-track control from the voice coil motor velocity detection circuit and storing the readout value in a memory; and monitoring the voice coil motor velocity detection value detected by the voice coil motor velocity detection circuit when an unload instruction is received and, if an absolute value of a difference between the monitored voice coil motor velocity detection value and the voice coil motor velocity detection value stored in said memory is not less than a prescribed value, reexecuting said calibration and performing unloading thereafter.

5. A method according to claim 4, wherein the carriage is moved to an inner-periphery stopper position to reexecute said calibration when the unload instruction is received.

6. A head loading/unloading type disk apparatus comprising:
   a voice coil motor for driving a carriage to move a head in a direction of radius of a disk;
   a voice coil motor velocity detection circuit for detecting a voice coil motor velocity corresponding to a back electromotive force of the voice coil motor;
   a ramp mechanism arranged outside an outer periphery of the disk to retract the head;
   a memory; and
   a controller for, at the start of loading control for loading the head from the ramp mechanism onto the disk, executing calibration for correcting a relationship between a value of a voice coil motor current flowing through the voice coil motor and the voice coil motor velocity detection value detected by the voice coil motor velocity detection circuit, said calibration being executed by obtaining a voice coil motor velocity detection value detected by the voice coil motor velocity detection circuit in a state where an actual velocity of the voice coil motor is set to zero and a current is supplied to the voice coil motor, and, immediately after switching from loading control to on-track control, reading out the voice coil motor velocity detection value from the voice coil motor velocity detection circuit and storing the readout value into said memory, monitoring the voice coil motor velocity detection value detected by the voice coil motor velocity detection circuit while the head is positioned on the disk, and reexecuting said calibration if an absolute value of a difference between the monitored voice coil motor velocity detection value and the voice coil motor velocity detection value stored in said memory is not less than a prescribed value.

* * * * *